(12) United States Patent
Ghule et al.

(10) Patent No.: US 11,451,585 B2
(45) Date of Patent: *Sep. 20, 2022

(54) ANTI-SPOOF CHECK OF IPV4-IN-IPV6 FRAGMENTS WITHOUT REASSEMBLY

(71) Applicant: Juniper Networks, Inc., Sunnyvale, CA (US)

(72) Inventors: Ashish Suresh Ghule, Bangalore (IN); Jagadish Narasimha Grandhi, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 16/682,882

(22) Filed: Nov. 13, 2019

(65) Prior Publication Data

US 2021/0144173 A1 May 13, 2021

(51) Int. Cl.
*H04L 9/40* (2022.01)
*H04L 45/02* (2022.01)
(Continued)

(52) U.S. Cl.
CPC .......... *H04L 63/1466* (2013.01); *H04L 45/02* (2013.01); *H04L 45/72* (2013.01);
(Continued)

(58) Field of Classification Search
USPC ........................................................ 726/13
See application file for complete search history.

(56) References Cited

U.S. PATENT DOCUMENTS

| 7,568,224 B1 | 7/2009 | Jennings et al. |
| 10,887,231 B2 | 1/2021 | Ghule et al. |

(Continued)

FOREIGN PATENT DOCUMENTS

| CN | 101933290 A | 12/2010 |
| CN | 102067569 A | 5/2011 |

(Continued)

OTHER PUBLICATIONS

Afek et al, "Network Anti-Spoofing with SDN Data plane", May 2017, IEEE INFOCOM 2017—IEEE Conference on Computer Communications, pp. 536-537 (Year: 2017).*

(Continued)

*Primary Examiner* — Sakinah White Taylor
(74) *Attorney, Agent, or Firm* — Shumaker & Sieffert, P.A.

(57) ABSTRACT

A network device may receive, from a first network, one or more fragments of a first network packet of a first network packet type, where the first network packet encapsulates a second network packet of a second network packet type. The network device may buffer the one or more fragments in. The network device may, upon receiving a fragment of the first network packet that includes an indication of a source network address and a source port for the second network packet, perform an anti-spoof check of the fragment flow without assembling the first network packet. The network device may, based on the fragment flow passing the anti-spoof check, in response to receiving all fragments of the first network packet: assemble the first network packet, decapsulate the second network packet from the assembled first network packet, and forward, to a second network, the second network packet.

17 Claims, 10 Drawing Sheets

(51) Int. Cl.
*H04L 45/00* (2022.01)
*H04L 47/32* (2022.01)
*H04L 49/90* (2022.01)
*H04L 69/22* (2022.01)
*H04L 101/686* (2022.01)

(52) U.S. Cl.
CPC .............. *H04L 47/32* (2013.01); *H04L 49/90* (2013.01); *H04L 63/0236* (2013.01); *H04L 63/1416* (2013.01); *H04L 63/1425* (2013.01); *H04L 69/22* (2013.01); *H04L 2101/686* (2022.05)

(56) References Cited

U.S. PATENT DOCUMENTS

| | | | |
|---|---|---|---|
| 2002/0196797 | A1 | 12/2002 | Battin |
| 2004/0064688 | A1 | 4/2004 | Jacobs |
| 2004/0088385 | A1 | 5/2004 | Blanchet et al. |
| 2004/0107287 | A1 | 6/2004 | Ananda et al. |
| 2006/0039379 | A1 | 2/2006 | Abe et al. |
| 2007/0195761 | A1 | 8/2007 | Tatar et al. |
| 2008/0028467 | A1* | 1/2008 | Kommareddy ..... H04L 63/1458 726/23 |
| 2009/0110003 | A1* | 4/2009 | Julien ................... H04L 69/166 370/476 |
| 2009/0154348 | A1 | 6/2009 | Newman |
| 2010/0014459 | A1 | 1/2010 | Mir et al. |
| 2010/0046522 | A1 | 2/2010 | Tatsumi et al. |
| 2010/0165991 | A1 | 7/2010 | Veal et al. |
| 2010/0287227 | A1 | 11/2010 | Goel et al. |
| 2011/0110374 | A1* | 5/2011 | Boucadair ......... H04L 2101/659 370/393 |
| 2011/0261822 | A1 | 10/2011 | Battestilli et al. |
| 2012/0246637 | A1 | 9/2012 | Kreeger et al. |
| 2014/0307738 | A1 | 10/2014 | Chen et al. |
| 2015/0063166 | A1 | 3/2015 | Sif et al. |
| 2015/0201447 | A1 | 7/2015 | Li et al. |
| 2015/0281069 | A1 | 10/2015 | Brzozowski et al. |
| 2016/0014071 | A1* | 1/2016 | Asati ...................... H04L 61/251 709/245 |
| 2016/0050140 | A1* | 2/2016 | Chinni .................... H04L 47/34 709/242 |
| 2017/0012873 | A1* | 1/2017 | Berg .................... H04L 61/2557 |
| 2017/0324849 | A1* | 11/2017 | Pfister ................... H04L 45/742 |
| 2019/0081720 | A1 | 3/2019 | Barry et al. |
| 2019/0089735 | A1 | 3/2019 | Mattila et al. |
| 2019/0149449 | A1* | 5/2019 | Morris .................. H04L 49/901 709/245 |
| 2019/0319924 | A1* | 10/2019 | Bouvet ............... H04L 63/1425 |
| 2019/0356591 | A1 | 11/2019 | Ghule et al. |
| 2020/0128114 | A1* | 4/2020 | Kloberdans ............. H04L 69/16 |
| 2021/0126863 | A1 | 4/2021 | Ghule et al. |

FOREIGN PATENT DOCUMENTS

| | | |
|---|---|---|
| CN | 103368853 A | 10/2013 |
| CN | 105900518 A | 8/2016 |

OTHER PUBLICATIONS

Aishwarya et al, "Intrusion detection system—An efficient way to thwart against Dos/DDos attack in the cloud environment", 2014 International Conference on Recent Trends in Information Technology, IEEE Conference on Computer Communications, pp. 1-6 (Year: 2014).*

Bremler-Barr et al, "Spoofing Prevention Method", Proceedings IEEE 24th Annual Joint Conference of the IEEE Computerand Communications Societies, IEEE Conference on Computer Communications, pp. 536-547 (Year: 2005).*

Final Office Action from U.S. Appl. No. 15/983,457, dated Mar. 11, 2020, 21 pp.

Amendment in Response to Office Action dated Mar. 11, 2020, from U.S. Appl. No. 15/983,457, filed May 11, 2020, 13 pp.

U.S. Appl. No. 16/836,240, filed Mar. 31, 2020, Juniper Networks, Inc. (inventor: Ghule et al.) entitled "IPv6 Flow Label for Stateless Handling of IPv4-Fragments-in-IPv6".

Response to Extended Search Report dated Jun. 22, 2020 from counterpart European Application No. 20155705.5, filed Nov. 16, 2021, 13 pp.

Extended Search Report from counterpart European Application No. 20155705.5, dated Jun. 22, 2020, 12 pp.

Ziemba et al., "Security Considerations for IP Fragment Filtering," Network Working Group: RFC 1858, Oct. 1995, 10 pp.

Amante et al., "IPv6 Flow Label Specification," Internet Engineering Task Force (IETF), RFC 6437, Nov. 2011, 15 pp.

Carpenter et al., "Using the IPv6 Flow Label for Equal Cost Multipath Routing and Link Aggregation in Tunnels," Internet Engineering Task Force (IETF), RFC 6438, Nov. 2011, 9 pp.

U.S. Appl. No. 16/947,141, filed Jul. 20, 2020, Juniper Networks, Inc. (inventor: Ghule et al.) entitled "IPv6 Extension Header for Stateless Handling of Fragments in IPv6".

Notice of Allowance from U.S. Appl. No. 15/983,457, dated Sep. 2, 2020, 21 pp.

Troan, et al., "Mapping of Address and Port with Encapsulation (MAP-E)," Internet Engineering Task Force (IETF), RFC 7597, Jul. 2015, 35pp.

Office Action dated Sep. 17, 2019 in U.S. Appl. No. 15/983,457, 20 pp.

U.S. Appl. No. 15/983,457, filed May 18, 2018, Juniper Networks, Inc. (inventor: Ghule), entitled "Packet Fragment Forwarding Without Reassembly".

Despres et al. "IPv4 Residual Deployment via IPv6—A Stateless Solution (4rd)," Internet Engineering Task Force (IETF), RFC 7600, Jul. 2015, 45 pp.

Xu et al., "Encapsulating IP in UDP; drafl-xu-intarea-ip-in-udp-09," INTAREA Working Group: Internet-Draft, Oct. 17, 2017, 11 pp.

Cui et al., "Public IPv4-over-IPv6 Access Network," IETF: RFC 7040, Nov. 2013, 13 pp.

Savola, "MTU and Fragmentation Issues with In-the-Network Tunneling," The Internet Society: RFC 4459, Apr. 2006, 14 pp.

Amendment in Response to Office Action dated Sep. 17, 2019, from U.S. Appl. No. 15/983,457, filed Dec. 17, 2019, 10 pp.

* cited by examiner

ANTI-SPOOF CHECK OF IPV4-IN-IPV6 FRAGMENTS WITHOUT REASSEMBLY

TECHNICAL FIELD

The disclosure relates to packet-based computer networks and, more particularly, to processing packets within network devices.

BACKGROUND

Internet Protocol version 6 (IPv6) is the successor to Internet Protocol version 4 (IPv4), both of which are versions of the Internet Protocol used for sending and receiving data via networks such as the Internet. IPv6 addresses potential issues with IPv4, such as address exhaustion. Networks have begun to transition from IPv4 to IPv6, and IPv6 networks are being deployed alongside IPv4 networks. One example mechanism for facilitating the transition from IPv4 to IPv6 is Mapping of Address and Port with Encapsulation (MAP-E). MAP-E is a mechanism for transporting IPv4 network packets across an IPv6 network using Internet Protocol (IP) encapsulation to encapsulate that IPv4 network packets within IPv6 network packets.

SUMMARY

This disclosure describes techniques for a network device to receive fragments of an IPv6 network packet that encapsulates an IPv4 network packet and to perform an anti-spoofing check of the IPv6 network packet without reassembling IPv6 network packets from its fragments. A network device may perform such an anti-spoof check by determining whether the source network address and the source port specified by the IPv4 network packet encapsulated within the IPv6 network packet fall within an acceptable range of values.

However, because each fragment of an IPv6 network packet includes a different non-overlapping portion of the IPv4 network packet, only a single fragment of the IPv6 network packet may include the portion of the IPv4 network packet that specifies the source network address and the source port for the IPv4 network packet, and because a network device may receive fragments of an IPv6 network packet out of order, it is possible that a network device may receive one or more fragments of the IPv6 network packet that do not contain the portion of the IPv4 network packet that specifies the source network address and the source port for the IPv4 network packet of the IPv4 network packet before it receives a fragment of the IPv6 network packet that contains the portion of the IPv4 network packet that specifies the source network address and the source port for the IPv4 network packet.

In accordance with aspects of this disclosure, a network device may receive fragments of an IPv6 network packet that each carry a different non-overlapping portion of an IPv4 network packet and buffer the IPv6 network packet fragments until the network device receives an IPv6 network packet fragment that carries the portion of the IPv4 network packet that specifies the source network address and the source port for the IPv4 network packet. When the network device receives the IPv6 network packet fragment that carries the portion of the IPv4 network packet that specifies the source network address and the source port for the IPv4 network packet, the network device may perform an anti-spoof check of the IPv6 network packet without assembling the IPv4 network packet from its fragments.

If the IPv6 network packet passes the anti-spoof check, the network device may continue to receive fragments of the IPv6 network packet until it has received all fragments of the IPv6 network packet, reassemble the IPv6 network packet, decapsulate the IPv4 network packet from the IPv6 network packet, and forward the IPv4 network packet contained within the reassembled IPv6 network packet to an IPv4 network. Conversely, if the IPv6 network packet fails the anti-spoof check, the network device may drop each of the received fragments for the IPv6 network packet and may also drop any subsequently received fragments for the IPv6 network packet without assembling the IPv6 network packet.

The techniques described herein may provide certain advantages. The techniques described herein allow a network device to avoid reassembling the entire IPv6 network packet from the fragments of the IPv6 network packet in order to perform an anti-spoof check on the IPv6 network packet. Because performing reassembly of IPv6 network packets uses processor and memory resources, refraining from reassembling the IPv6 network packet from the fragments of the IPv6 network packet in order to perform the anti-spoof check may enable the network device to perform anti-spoof checks on IPv6 network packets in a way that uses fewer processor and memory resources. This improves the performance of the network device in perform anti-spoof checks on IPv6 network packets, by enabling the network device to increase the speed at which it performs anti-spoof checks on IPv6 network packets while expending less processing power and using fewer memory resources to perform such anti-spoof checks.

In one example, the disclosure is directed to a method. The method includes receiving, by a network device from a first network, one or more fragments of a first network packet of a first network packet type, wherein the one or more fragments of the first network packet are part of a fragment flow, and wherein the first network packet encapsulates a second network packet of a second network packet type. The method further includes in response to determining that the network device has not yet received a fragment of the first network packet that includes indications of a source network address and a source port for the second network packet, buffering, by the network device, the one or more fragments in a fragment buffer. The method further includes in response to receiving the fragment of the first network packet that includes the indications of the source network address and the source port for the second network packet, performing, by the network device, an anti-spoof check of the fragment flow based at least in part on the source network address and the source port for the second network packet without assembling the first network packet. The method further includes based on the fragment flow passing the anti-spoof check, in response to receiving all fragments of the first network packet: assembling, by the network device, the first network packet, decapsulating, by the network device, the second network packet from the assembled first network packet, and dispatching, by the network device to a second network, the second network packet.

In another example, the disclosure is directed to a network device. The network device includes one or more network interfaces configured to receive, from a first network, one or more fragments of a first network packet of a first network packet type, wherein the one or more fragments of the first network packet are part of a fragment flow, and wherein the first network packet encapsulates a second network packet of a second network packet type. The network device further includes one or more processors configured to: in response to determining that the one or more network interfaces has not yet received a fragment of the first network packet that includes indications of a source network address and a source port for the second network packet, buffer the one or more fragments in a fragment buffer; in response to the one or more network interfaces receiving the fragment of the first network packet that includes the indications of the source network address and the source port for the second network packet, perform an anti-spoof check of the fragment flow based at least in part on the source network address and the source port for the second network packet without assembling the first network packet; and based on the fragment flow passing the anti-spoof check, in response to receiving all fragments of the first network packet: assemble the first network packet, and decapsulate the second network packet from the assembled first network packet; wherein the one or more network interfaces are further configured to dispatch the second network packet to a second network.

In another example, the disclosure is directed to a computer-readable medium comprising instructions for causing a programmable processor to: receive, from a first network, one or more fragments of a first network packet of a first network packet type, wherein the one or more fragments of the first network packet are part of a fragment flow, and wherein the first network packet encapsulates a second network packet of a second network packet type; in response to determining that a fragment of the first network packet that includes indications of a source network address and a source port for the second network packet has not yet been received, buffer the one or more fragments in a fragment buffer; in response to receiving the fragment of the first network packet that includes the indications of the source network address and the source port for the second network packet, perform an anti-spoof check of the fragment flow based at least in part on the source network address and the source port for the second network packet without assembling the first network packet; and based on the fragment flow passing the anti-spoof check, in response to receiving all fragments of the first network packet: assemble the first network packet, decapsulate the second network packet from the assembled first network packet, and dispatch, to a second network, the second network packet.

The details of one or more techniques of the disclosure are set forth in the accompanying drawings and the description below. Other features, objects, and advantages of the techniques will be apparent from the description and drawings, and from the claims.

DETAILED DESCRIPTION

Figure 1:
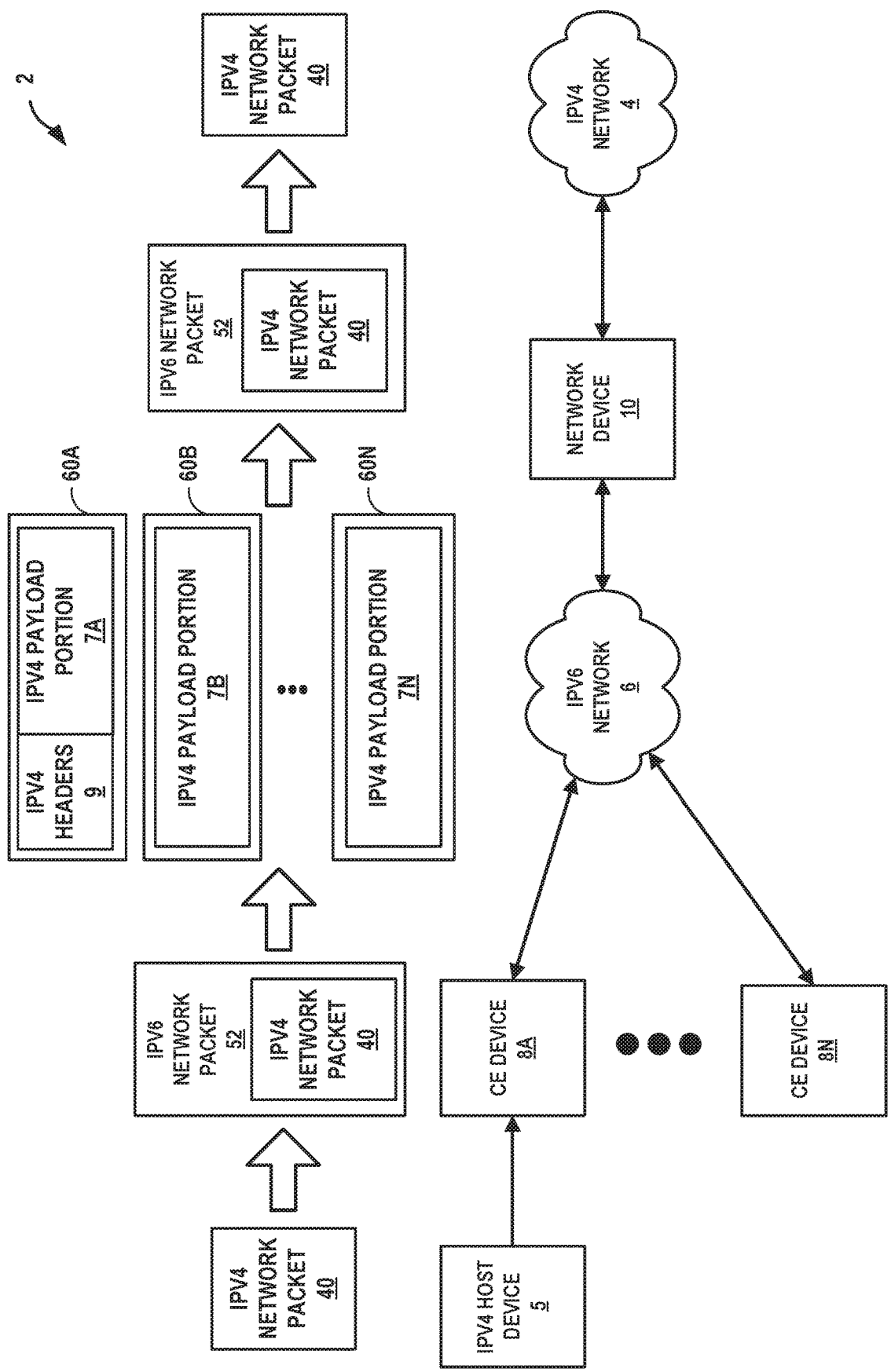
FIG. 1 is a block diagram illustrating a system in which a network device may connect an IPv4 network 4 to an IPv6 network 6, according to aspects of the present disclosure.

FIG. 1 is a block diagram illustrating a system 2 in which a network device 10 may connect an IPv4 network 4 to an IPv6 network 6, according to aspects of the present disclosure. Network device 10 may be, for example, a MAP-E enabled router (e.g., a MAP border relay device) managed by a service provider at the edge of a MAP domain, having at least one IPv6 enabled interface connecting network device 10 to IPv6 network 6, and at least one IPv4 interface connecting network device to IPv4 network 4. In some examples, some or all of system 2 may be part of a service provider network (not shown).

As shown in FIG. 1, one of customer edge (CE) devices 8A-8N ("CE devices 8"), such as a customer edge router, may receive an IPv4 network packet 40 from IPv4 host device 5 that is to be forwarded to IPv4 network 4. For example, IPv4 host device 5 may be any suitable computing device. In order to forward the IPv4 network packet 40 to IPv4 network 4, the CE device may have to send the IPv4 network packet 40 via IPv6 network 6 and network device 10 to IPv4 network 4 by encapsulating an IPv4 network packet 52 within an IPv6 network packet. If the resulting IPv6 network packet 52 is larger than a maximum transmission unit (MTU) for IPv6 network 6, the customer edge device that encapsulates the IPv4 network packet 40 within the IPv6 network packet 52, such as CE device 8A, may fragment the IPv6 network packet 52 into IPv6 network packet fragments 60A-60N and may send the IPv6 network packet fragments 60A-60N via IPv6 network 6 to network device 10.

As mentioned throughout this disclosure, all fragments of an IPv6 network packet may make up a fragment flow for the IPv6 network packet. In the example of FIG. 1, fragments 60A-60N may be a part of a fragment flow for IPv6 network packet 52. Network device 10 may receive, from IPv6 network 6, the IPv6 network packet fragments 60A-60N, not necessarily in order, perform an anti-spoofing check on the fragment flow of IPv6 network packet 52, and, if the fragment flow for the IPv6 network packet 52 pass the anti-spoofing checks, reassemble the IPv6 network packet 52 from the IPv6 network packet fragments 60A-60N. Network device 10 may then decapsulate the IPv4 network packet 40 from the reassembled IPv6 network packet 52 and may forward the IPv4 network packet 40 to IPv4 network 4. If the fragment flow for IPv6 network packet 52 does not pass the anti-spoofing check, network device 10 may refrain from assembling the IPv6 network packet 52 from its fragments 60A-60N

To prevent spoofing of IPv6 addresses, network device 10 may perform an anti-spoof check on a fragment flow of the IPv6 network packet 52 that it receives, and network device 10 may not be able to decapsulate and forward any IPv4 network packets onto IPv4 network 4 until it has performed the anti-spoofing check on the IPv6 network packet 52 that encapsulates the IPv4 network packet 40. Network device 10 may perform the anti-spoof check of a fragment flow for an IPv6 network packet 52 based at least in part on the source network address and the source port specified by the IPv4 network packet 40 encapsulated in the IPv6 network packet 52, which is contained in the transport protocol header of the IPv4 network packet 40.

However, not every fragment of the IPv6 network packet 52 may include the portion of transport header of the IPv4 network packet 40 that specifies the source network address and the source port for the IPv4 network packet 40 because each fragment of the IPv6 network packet 52 may include a different portion of the IPv4 network packet 40. In some examples, only a single fragment of the IPv6 network packet 52, such as IPv6 network packet fragment 60A, may include the portion of the IPv4 network packet 40 that specifies the source network address and the source port for the IPv4 network packet 40.

As shown in FIG. 1, each fragment of IPv6 network packet fragments 60A-60N may carry a different non-overlapping portion of the payload of IPv4 network packet 40. For example, IPv6 network packet fragment 60A carries IPv4 network packet payload portion 7A, IPv6 network packet fragment 60B carries IPv4 network packet payload portion 7B, and IPv6 network packet fragment 60N carries IPv4 network packet payload portion 7N, each of which is a portion of the payload of IPv4 network packet 40.

However, only one fragment out of IPv6 network packet fragments 60 may carry the headers portions of IPv4 network packet 40. As shown in FIG. 1, IPv6 network packet fragment 60A is the only fragment out of IPv6 network packet fragments 60 that carries IPv4 headers 9, which are the headers of IPv4 network packet 40, including the headers that include the source address and the source host of IPv4 network packet 40 that network device 10 may use to perform the anti-spoof check on the fragment flow of IPv6 network packet 52.

In accordance with some aspects of the present disclosure, network device 10 may receive fragments 60 of an IPv6 network packet 52 from one of CE devices 8 via IPv6 network 6, where the IPv6 network packet 52 encapsulates an IPv4 network packet 40, and may buffer the received IPv6 network packet fragments, such as fragments 60B and 60N, until network device 10 receives an IPv6 network packet fragment, such as fragment 60A, that includes the portion of the IPv4 network packet 40 that specifies the source network address and the source port for the IPv4 network packet 40, such as IPv4 headers 9. When network device 10 receives the IPv6 network packet fragment that includes the portion of the IPv4 network packet 40 that specifies the source network address and the source port for the IPv4 network packet 40, network device 10 may perform an anti-spoof check of the IPv6 network packet 52, without actually reassembling the IPv6 network packet 52 from the IPv6 network packet fragments 60, based at least in part on the portion of the IPv4 network packet 40 that specifies the source network address and the source port for the IPv4 network packet 40.

When network device 10 performs the anti-spoof check of the fragment flow of the IPv6 network packet 52, network device 10 refrains from assembling the IPv6 network packet 52 from IPv6 network packet fragments 60. Instead, network device 10 may perform the anti-spoof check of the IPv6 network packet based on the IPv6 network packet fragment, such as fragment 60A, that contains the portion of the IPv4 network packet 40 that specifies the IPv4 source network address and the source port for the IPv4 network packet 40. In particular, network device 10 may determine, from the IPv6 source network address of the IPv6 network packet 52, values of acceptable ranges for the source network address and the source port of the IPv4 network packet 40.

To determine the values of acceptable ranges for the source network address and the source port of the IPv4 network packet 40, network device 10 may extract an embedded IPv4 network address and a Port Set Identifier (PSID) from the IPv6 source network address of the IPv6 network packet 52 based on one or more matching Mapping of Address and Port (MAP) rules. The embedded IPv4 network address and the PSID extracted from the IPv6 source network address of the IPv6 network packet 52 may represent the values of acceptable ranges for the source network address and the source port of the IPv4 network packet 40 encapsulated within the IPv6 network packet 52.

Thus, network device 10 may determine that the IPv6 network packet 52 passes the anti-spoof check if the source network address of the IPv4 network address matches the embedded IPv4 network address extracted from the IPv6 network packet 52 and if the source port of the IPv4 network address falls within a set of ports specified by the PSID. Conversely, network device 10 may determine that the IPv6 network packet 52 fails the anti-spoof check if the source network address of the IPv4 network address does not match the embedded IPv4 network address extracted from the IPv6 network packet 52 or if the source port of the IPv4 network address does not fall within a set of ports specified by the PSID. In this way, network device 10 may perform the anti-spoof check on IPv6 network packet 52 without assembling IPv6 network packet from its fragments.

If the IPv6 network packet 52 passes the anti-spoof check, network device 10 may continue to buffer the IPv6 network packet fragments 60 it receives for that IPv6 network packet 52 until it has received every fragment of the IPv6 network packet 52. Once network device 10 has received all fragments of the IPv6 network packet 52, network device 10 may reassemble the IPv6 network packet 52 from the fragments, decapsulate the IPv4 network packet 40 from the reassembled IPv6 network packet 52, and forward the IPv4 network packet 40 onto IPv4 network 4. Conversely, if the IPv6 network packet 52 does not pass the anti-spoof check, network device 10 may refrain from reassembling the IPv6 network packet 52. Instead, network device 10 may drop the fragments 60 of the IPv6 network packet 52 it has received and may drop any remaining IPv6 network packet fragments 60 that it receives without conducting an anti-spoof check on the subsequently received IPv6 network packet fragments 60.

In this manner, network device 10 avoids assembling an entire IPv6 network packet 52 from the fragments 60 of the IPv6 network packet 52 in order to perform an anti-spoof check on the IPv6 network packet 52. Because performing reassembly of IPv6 network packets uses processor and memory resources, refraining from reassembling the IPv6 network packet from the fragments of the IPv6 network packet in order to perform the anti-spoof check may enable the network device 10 to perform anti-spoof checks on IPv6 network packets in a way that uses fewer processor and memory resources. This improves the performance of the network device 10 in perform anti-spoof checks on IPv6 network packets, by enabling the network device 10 to increase the speed at which it performs anti-spoof checks on IPv6 network packets while expending less processing power and using fewer memory resources to perform such anti-spoof checks.

Figure 2:
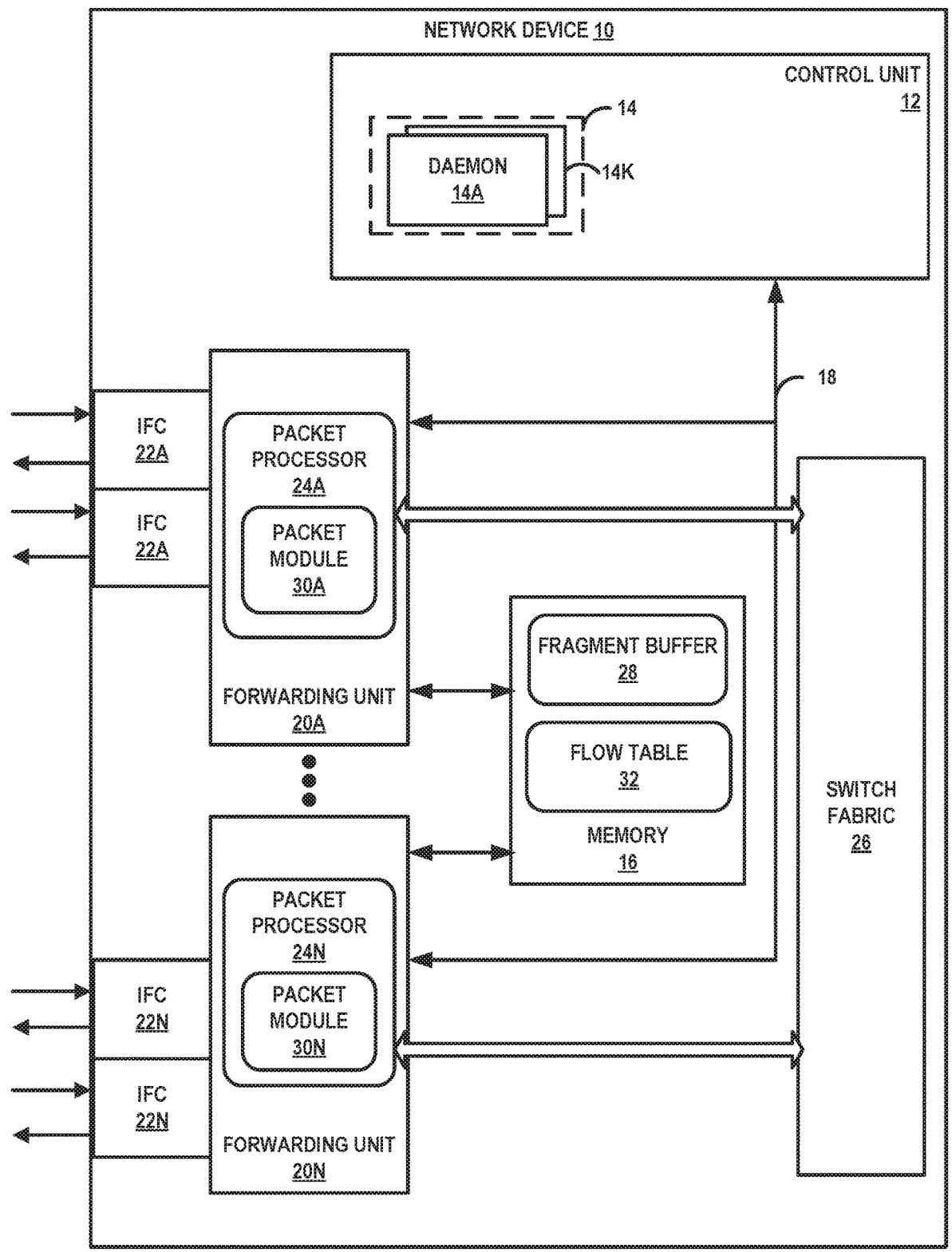
FIG. 2 is a block diagram illustrating an example network device 10 that is configured to perform anti-spoofing checks on fragments of an IPv6 network packet without reassembling the IPv6 network packets from its fragments, where the IPv4 network packet encapsulates an IPv4 network packet, according to aspects of the present disclosure.

FIG. 2 is a block diagram illustrating an example network device 10 that is configured to perform anti-spoofing checks on fragments of an IPv6 network packet without reassembling the IPv6 network packets from its fragments, where the IPv4 network packet encapsulates an IPv4 network packet, according to techniques described herein. Network device 10 may include a router such as a provider edge or customer edge router, a core router, or another type of network device, such as a switch. In some examples, network device is a MAP border relay router. In this example, network device 10 includes a control unit 12 that provides control plane functionality for the device. Network device 10 also includes memory 16, a plurality of forwarding units 20A-20N ("forwarding units 20"), and a switch fabric 26 that together provide a data plane for processing network traffic.

Forwarding units 20 receive and send data packets via interfaces of interface cards 22A-22N ("IFCs 22") each associated with a respective one of forwarding units 20. Each of forwarding units 20 and its associated ones of IFCs 22 may represent a separate line card insertable within a chassis (not shown) of network device 10. IFCs 22 may be referred to throughout this disclosure as one or more network interfaces. Example line cards include flexible programmable integrated circuit (PIC) concentrators (FPCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 20 may include more or fewer IFCs. Switch fabric 26 provides a high-speed interconnect among forwarding units 20 for forwarding incoming data packets to an egress forwarding unit of forwarding units 20 for output over a network that includes network device 10.

Control unit 12 is connected to each of forwarding units 20 by internal communication links 18. Internal communication links 18 may include a 100 Mbps Ethernet connection, for instance. Control unit 12 configures, by sending instructions and other configuration data via internal communication link 18, forwarding units 20 to define control processing operations applied to packets received by forwarding units 20.

Control unit 12 executes a plurality of applications, including daemons 14A-14K ("daemons 14"). Each of the applications may represent a separate process managed by a control unit operating system. Daemons 14 may represent user-level processes that are developed and deployed by the manufacturer of the network device 10. As such, daemons 14 are "native" to the network device 10 in that the development of the applications is carefully managed by the manufacturer to facilitate secure, robust, and predictable operation of the network device 10, such operation defined at least in part according to a configuration specified by an operator (e.g., a service provider, enterprise, or other customer of the network device 10 manufacturer). Daemons 14 may run network management software, execute routing protocols to communicate with peer routing devices, maintain and update one or more routing tables, and create one or more forwarding tables for installation to forwarding units 20, among other functions.

Control unit 12 may include one or more processors (not shown in FIG. 2) that execute software instructions, such as those used to define a software or computer program, stored to a computer-readable storage medium, such as memory 16, which may be non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 20 may be operably coupled to memory 16 that stores fragment buffer 28 and flow table 32 that are shared by the forwarding units of forwarding units 20. Memory 16, fragment buffer 28, and flow table 32 may be external to forwarding units 20, and may reside in the forwarding plane of network device 10 (as shown in FIG. 2), or memory 16, fragment buffer 28, and flow table 32 may be part of control unit 12 in the control plane of network device 10. In some examples, each of forwarding units 20 accesses memory 16 via switch fabric 26, rather than being directly coupled to memory 16 as shown in FIG. 2. In these examples, fragment buffer 28 and flow table 32 are shared across the multiple forwarding units 20, such that each of the packet modules 30 are concurrently accessing the same flow table 32 and a common pool of fragment buffers 28.

Flow table 32 may store information regarding fragments of network packets encountered by network device 10, such as via IFCs 22, and may include entries associated with network packets encountered by network device 10. Each entry in flow table 32 may be associated with a different network packet encountered by network device 10, such that each entry in flow table 32 may contains information about fragments of the network packet associate with the entry in flow table 32.

Fragment buffer 28 may store fragments of network packets, such as fragments of IPv6 network packets on which network device 10 may perform one or more operations. For example, fragment buffer 28 may store fragments received by any of IFCs 22. Similarly, a packet processor such as packet processor 24A of forwarding unit 20A may perform one or more operations on the fragments stored in fragment buffer 28 and may output the fragments stored in fragment buffer 28 via IFC 22A.

In some examples, fragment buffer 28 may be reassembly buffers of network device 10 that has typically been used by network device 10 to store fragments of IPv6 network packets that network device 10 may reassemble in order to perform an anti-spoof check on the IPv6 network packet. However, the techniques disclosed in this disclosure may be able to perform one or more operations on the fragments stored in fragment buffer 28, such as anti-spoof checks, without reassembling an IPv6 network packet from the fragments stored in fragment buffer 28.

Each forwarding unit of forwarding units 20 includes at least one packet processor 24 that processes packets by performing a series of operations on each packet over respective internal packet forwarding paths as the packets traverse the internal architecture of network device 10. Packet processor 24A of forwarding unit 20A, for instance, includes one or more configurable hardware chips (e.g., a chipset) that, when configured by applications executing on control unit 12, define the operations to be performed by packets received by forwarding unit 20. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 20 may include one or more packet processors 24.

Operations may be performed, for example, on each packet by any of a corresponding ingress interface, an ingress forwarding unit 20, an egress forwarding unit 20, an egress interface or other components of network device 10 to which the packet is directed prior to egress, such as one or more service cards. Packet processors 24 process packets to identify packet properties and perform actions bound to the properties. Each of packet processors 24 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. The result of packet processing determines the manner in which a packet is forwarded or otherwise processed by packet processors 24 of forwarding units 20 from its input interface on one of IFCs 22 to, at least in some cases, its output interface on one of IFCs 22.

Packet processors 24 include respective packet modules 30A-30N ("packet module 30") that execute at packet processors 24 to receive, via IFCs 22 from IPv6 network 6, fragments of an IPv6 network packet. The IPv6 network packet may encapsulate an IPv4 network packet that is to be forwarded to IPv4 network 4, such that each fragment of the IPv6 network packet may include a different non-overlapping portion of the IPv4 network packet encapsulated by the IPv6 network packet. Packet module 30 may perform an anti-spoof check on a fragment of the IPv6 network packet without reassembling the entire IPv6 network packet. If the fragment of the IPv6 network packet pass the anti-spoof check, packet module 30 may continue to receive any remaining fragments of the IPv6 network packet, reassemble the IPv6 network packet from the fragments of the IPv6 network packet, decapsulate the IPv4 network packet from the reassembled IPv6 network packet, and forward the IPv4 network packet to IPv4 network 4. Packet module 30 may perform the anti-spoof checks when anti-spoof check is enabled in packet module 30. If anti-spoof check is not enabled, packet module 30 may reassemble the IPv6 network packet, decapsulate the IPv4 network packet from the IPv6 network packet, and forward the IPv4 network packet to IPv4 network 4 without performing the anti-spoof checks.

The set of fragments of a particular IPv6 network packet that is received by network device 10 is referred to herein as a fragment flow, such that every fragment of a particular IPv6 network packet is part of the same fragment flow. Network device 10 may receive fragments of IPv6 network packet from IPv6 network 6. Thus, a fragment flow for an IPv6 network packet includes fragments of the IPv6 network packet received by network device 10.

Packet module 30 may perform an anti-spoof check on the fragment flow for an IPv6 network packet by performing an anti-spoof check based at least in part on the IPv4 source network address and the source port of the IPv4 network packet encapsulated within the IPv6 network packet. In particular, packet module may perform an anti-spoof check on the header of the IPv6 network packet by determining whether the IPv4 source network address and the source port of the IPv4 network packet are each within a respective acceptable range. If the IPv4 source network address and the source port are each within a respective acceptable range, then the fragment passes the anti-spoof check. However, if at least one of the IPv4 source network address or the source port is not within a respective acceptable range, then the fragment fails the anti-spoof check.

To determine the values of acceptable ranges for the source network address and the source port of the IPv4 network packet, packet module 30 may extract an embedded IPv4 network address and a Port Set Identifier (PSID) from the IPv6 source network address of the IPv6 network packet based on one or more matching Mapping of Address and Port (MAP) rules. The embedded IPv4 network address and the PSID extracted from the IPv6 source network address of the IPv6 network packet may represent the values of acceptable ranges for the source network address and the source port of the IPv4 network packet.

Thus, packet module 30 may determine that the IPv6 network packet passes the anti-spoof check if the source network address of the IPv4 network address matches the embedded IPv4 network address extracted from the IPv6 network packet and if the source port of the IPv4 network address falls within a set of ports specified by the PSID. Conversely, packet module 30 may determine that the IPv6 network packet fails the anti-spoof check if the source network address of the IPv4 network address does not match the embedded IPv4 network address extracted from the IPv6 network packet or if the source port of the IPv4 network address does not fall within a set of ports specified by the PSID. In this way, packet module 30 may perform the anti-spoof check on IPv6 network packet without assembling IPv6 network packet from its fragments.

Because each fragment of an IPv6 network packet contains a different non-overlapping portion of the IPv4 network packet, only a single fragment of the fragment flow for an IPv6 network packet may include the portion of the IPv4 network packet that specifies the IPv4 source network address and the source port for the IPv4 network packet. Thus, when packet module 30 encounters fragments of the fragment flow that do not include the portion of the IPv4 network packet that specifies the IPv4 source network address and the source port for the IPv4 network packet, packet module 30 is unable to perform the anti-spoof check for the fragment flow. Instead, packet module 30 may buffer fragments of the fragment flow for an IPv6 network packet in fragment buffer 28 until network device 10 receives a fragment of the fragment flow that includes the portion of the IPv4 network packet that specifies the IPv4 source network address and the source port for the IPv4 network packet.

When network device 10 receives the fragment of the fragment flow that includes the portion of the IPv4 network packet that specifies the IPv4 source network address and the source port for the IPv4 network packet, packet module 30 may be able to perform anti-spoof checks on the IPv6 network packet, such as via the techniques discussed above.

If the IPv6 network packet passes the anti-spoof check, packet module 30 may determine that the fragment flow for the IPv6 network packet passes the anti-spoof check. Conversely, if the IPv6 network packet fails the anti-spoof check, packet module 30 may determine that the fragment flow for the IPv6 network packet fails the anti-spoof check.

When packet module 30 encounters fragments of a fragment flow for an IPv6 network packet, packet module 30 may add an entry associated with the fragment flow for the IPv6 network packet encountered by packet module 30 to flow table 32. Because packet module 30 may handle multiple fragment flows, packet module 30 may include an entry for each fragment flow that it encounters to flow table 32. When packet module 30 finishes processing of a fragment flow, packet module 30 may delete the entry associated with the fragment flow from flow table 32.

The entry in flow table 32 for a fragment flow for an IPv6 network packet may store various information associated with the fragment flow that may be used by packet module 30 to process fragments of the fragment flow in order to perform anti-spoof checks on the fragment flow. In particular, packet module 30 may use the information stored in the entry for the fragment flow to determine whether to buffer fragments of the fragment flow received by network device 10 into fragment buffer 28, whether to perform an anti-spoof check on a fragments of the fragment flow received by network device 10, or whether to drop fragments of the fragment flow received by network device 10.

The entry for a fragment flow in flow table 32 may include or otherwise be associated with a key that may be used to index into flow table 32 to look up and locate the entry in flow table 32 for a particular fragment flow entry. The key for an entry in flow table 32 for a fragment flow associated with an IPv6 network packet may be generated, such as via hashing, based at least in part on the following values specified by each fragment of an IPv6 network packet: the IPv6 source network address, the IPv6 fragment next header, and the IPv6 fragment identification. The IPv6 source network address indicates the source of the IPv6 network packet and is used by network device 10 to perform the anti-spoof check. The IPv6 fragment next header is a value that identifies the type of header following the IPv6 header in the fragment. The IPv6 fragment identification is an identifier value that is the same for each fragment of the same fragment flow. Each of these values are the same for each fragment of the fragment flow, thereby allowing network device 10 to use such information to identify fragments of the same IPv6 network packet.

An entry in flow table 32 for a fragment flow associated with an IPv6 network packet may include a state field ("State"), a spoof result field ("SPOOF_RESULT"), a queued bytes field ("QUED_BYTS"), a dropped bytes field ("DROPPED_BYTS"), a total length field ("TOTAL_BYTS"), and a timer field ("Timer"). The state field may store a value that indicates the state of the fragment flow. A fragment flow associated with an IPv6 network packet may be in one of the following states: a new entry state, a buffer state, a spoof status available state, and a drop state. As network device 10 receives fragments of a fragment flow, packet module 30 may create an entry in flow table 32 for the fragment flow and may populate the fields of the entry with values based at least in part on the fragments of the fragment flow that it has received.

Because a fragment flow is in a new entry state when flow table 32 does not include an entry for the fragment flow, the value of the state field may only indicate whether the fragment flow is in a buffer state, a spoof status available state, or a drop state.

The spoof result field may store a value indicative of whether the fragment flow passes the anti-spoof check (e.g., "PASS") or fails the anti-spoof check (e.g., "FAIL"). Because packet module 30 may not perform an anti-spoof check on the fragment flow until network device 10 receives the first fragment of the IPv6 network packet that includes the portion of the IPv4 network packet that specifies the source network address and the source port for the IPv4 network packet, the spoof result field may be empty until packet module 30 has performed the anti-spoof check on the fragment flow.

The queued bytes field may store a value indicative of the total size of the fragments of the fragment flow currently being buffered by packet module 30 in fragment buffer 28. Each time packet module 30 receives and buffers a fragment of the fragment flow in fragment buffer 28, packet module 30 may increment the value of the queued bytes field by the size of the buffered fragment.

The dropped bytes field may store a value indicative of the total size of the fragments of the fragment flow that packet module 30 has dropped. Packet module 30 may drop fragments of the fragment flow if the spoof result field indicates that the fragment flow has failed the anti-spoof check, if packet module 30 encounters fragments of the fragment flow while the fragment flow is in the drop state, or if the amount of time that has elapsed during processing of the fragment flow exceeds a specified reassembly timeout.

The total length field may store a value indicative of the total size of all of the fragments of the fragment flow. When packet module 30 receives the last fragment of the fragment flow, packet module 30 may be able to determine the total size of all of the fragments of the fragment flow based on the fragment offset of the last fragment and the payload length specified by the last fragment. The sizes of the fragments indicated by the values of the sent bytes field, queued bytes field, dropped bytes field, and total length field may not include the size of the IPv6 header nor the IPv6 fragment header included in the fragments. As will be further discussed below, each fragment of an IPv6 packet may include a respective IPv6 fragment header, IPv6 header, and data section. As such, the values of the queued bytes field, dropped bytes field, and total length field may indicate the size of the data sections of the fragments buffered by network device 10, the size of the data sections of the fragments dropped by network device 10, and the size of the data sections of all fragments making up the fragment flow, respectively. Packet module 30 may determine the size of the data section of a fragment by subtracting the size of the IPv6 fragment header from the size of the fragment.

The timer field may store a value indicative of the amount of time that has elapsed during processing of the fragment flow. As packet module 30 receives fragments of the fragment flow, packet module 30 may update the value of the timer field with the amount of that that has elapsed during processing of the fragment flow. If the amount of time that has elapsed during processing of the fragment flow exceeds a reassembly time out value, packet module 30 may cease processing of the fragments of the fragment flow.

Figure 3A:
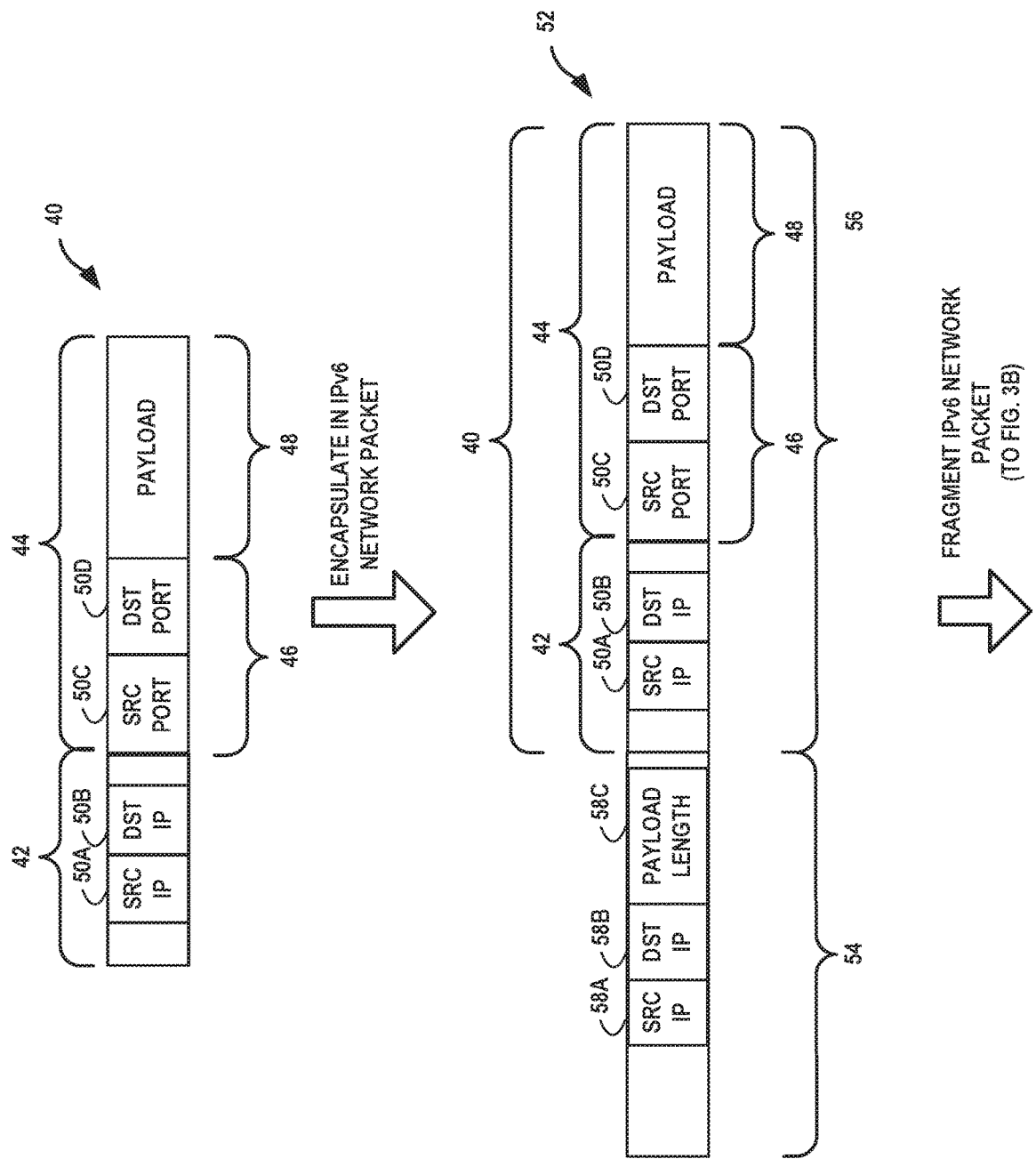
FIG. 3A is a block diagram that illustrates encapsulating an IPv4 network packet in an IPv6 network packet.

FIG. 3A is a block diagram that illustrates encapsulating an IPv4 network packet in an IPv6 network packet. A consumer edge (CE) device, such as CE device 8A shown in FIG. 1, may encapsulate an IPv4 network packet in an IPv6 network packet so that CE device 8A may transmit the IPv4 network packet through an IPv6 network, such as IPv6 network 6 shown in FIG. 1.

Figure 4:
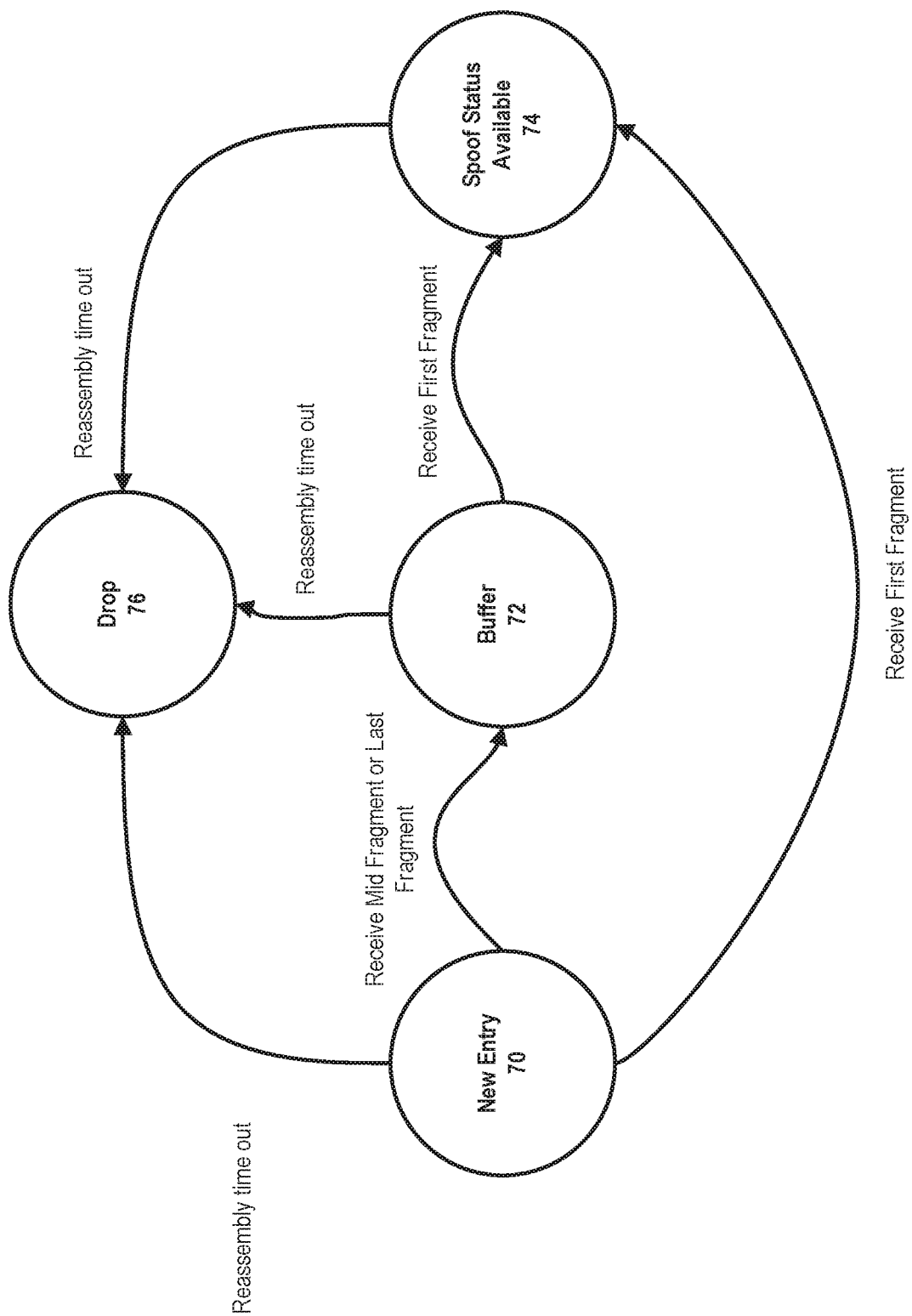
FIG. 4 is a block diagram illustrating the state transitions of an example fragment flow, according to the techniques described herein.

As shown in FIG. 3A, IPv4 network packet 40 may include header 42 followed by data section 44. Header 42 may include fields that specifies various information regarding IPv4 network packet 40. In the example of FIG. 4, the fields in header 42 may include source network address 50A and destination address 50B. Source network address 50A specifies the IPv4 address of the sender of IPv4 network packet 40 and destination address 50B specifies the IPv4 address of the receiver of IPv4 network packet 40. Header 42 may include additional fields not shown in FIG. 4. For example, header 42 may include a total of fourteen fields, thirteen of which are required.

Data section 44 of IPv4 network packet 40 may include data associated with the transport layer protocol, such as TCP, UDP, and the like, utilized by IPv4 network packet 40. Data section 44 of IPv4 network packet 40 may include transport protocol header 46 followed by payload 48. Transport protocol header 46 may be a TCP header, UDP header, and the like depending on the transport layer protocol used by IPv4 network packet 40. Transport protocol header 46 may include source port 50C and destination port 50D. Source port 50C identifies the source port of IPv4 network packet 40, and destination port 50D identifies the destination port of IPv4 network packet 40. Transport protocol header 46 may include additional fields not shown in FIG. 3A. Payload 48 may be data carried by IPv4 network packet 40 besides header 42 and transport protocol header 46.

A customer edge device, such as one of customer devices 8 shown in FIG. 1, may encapsulate IPv4 network packet 40 in an IPv6 network packet to result in IPv6 network packet 52 that encapsulates IPv4 network packet 40. An IPv6 network packet includes a header and a payload. As such, in the example, of FIG. 3A, IPv6 network packet 52 includes IPv6 header 54 and payload 56. To encapsulate IPv4 network packet 40 in IPv6 network packet 52, the CE device may generate IPv6 header 54 for IPv6 network packet 52 and may encapsulate IPv4 network packet 40 in IPv6 network packet 52 as payload 56 of IPv6 network packet 52.

IPv6 network packet header 54 includes source network address 58A and destination address 58B, each of which is an IPv6 network address. A customer device may determine the values of IPv6 source network address 58A and IPv6 destination address 58B based on the IPv4 network packet 40 encapsulated in IPv6 network packet 52. For example, the customer device may use one or more Mapping of Address and Port (MAP) rules to map the IPv4 source network address 50A and source port 50C in IPv4 network packet 40 to an IPv6 network address as source network address 58A, and may similarly use one or more MAP rules to map IPv4 destination address 50B and destination port 50D to an IPv6 network address as destination address 58B. IPv6 network packet header 54 may also include payload length field 58C that indicates the size of payload 56 of IPv6 network packet 52.

If the IPv6 network packet 52 that encapsulates IPv4 network packet 40 is larger than a maximum transmission unit (MTU) for IPv6 network 6, the customer edge device that encapsulates IPv4 network packet 40 within IPv6 network packet 52 may fragment IPv6 network packet 40 into IPv6 network packet fragments and may send the IPv6 network packet fragments via IPv6 network 6 to network device 10.

Figure 3B:
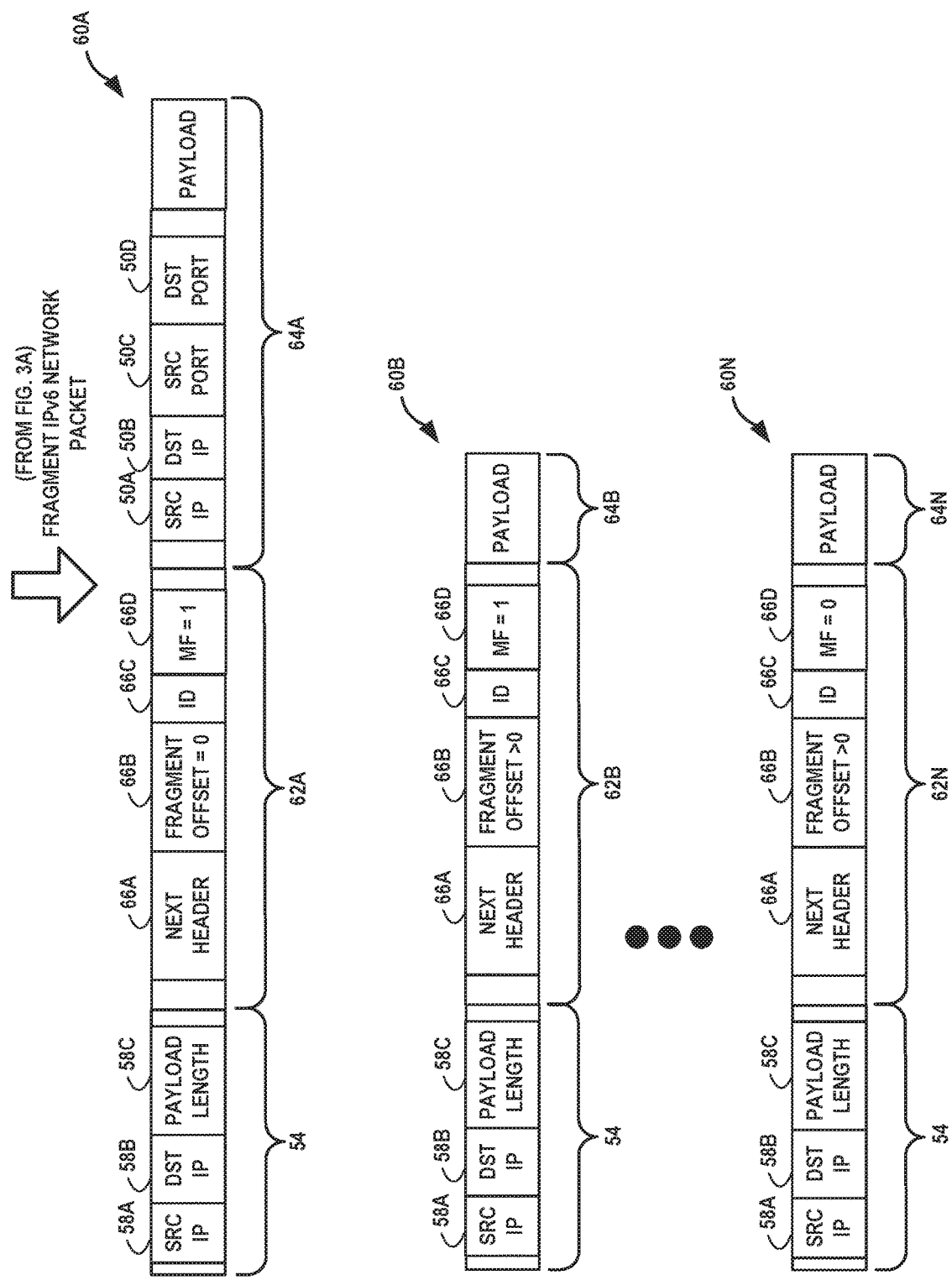
FIG. 3B is a block diagram illustrating fragmenting of an IPv6 network packet that encapsulates an IPv4 network packet into IPv6 network packet fragments.

FIG. 3B is a block diagram illustrating fragmenting of an IPv6 network packet 52 that encapsulates an IPv4 network packet 40 into IPv6 network packet fragments. A customer edge device may fragment an IPv6 network packet into IPv6 network packet fragments. Each IPv6 network packet fragment may include an IPv6 network packet header from the IPv6 network packet, a fragment header, and a payload, where the payload of each IPv6 network packet fragment is a non-overlapping portion of the IPv4 network packet encapsulated in the IPv6 network packet.

As shown in FIG. 3B, a customer edge device may fragment IPv6 network packet 52 into IPv6 network packet fragments 60A-60N ("IPv6 network packet fragments 60"). While IPv6 network packet 52 is fragmented into N fragments in the example of FIG. 3B, an IPv6 network packet may be fragmented into any number of (i.e., 2 or more) fragments in accordance with the techniques of this disclosure.

Each IPv6 network packet fragment includes the IPv6 network packet header from the IPv6 network packet, a fragment header, and a payload. Thus, IPv6 network packet fragment 60A includes IPv6 network header 54 from IPv6 network packet 52, fragment header 62A, and payload 64A. Similarly, IPv6 network packet fragment 60B includes IPv6 network packet header 54 from IPv6 network packet 52, fragment header 62B, and payload 64B, and IPv6 network packet fragment 60N includes IPv6 network packet header 54 from IPv6 network packet 52, fragment header 62N, and payload 64N.

IPv6 network packet header 54 from IPv6 network packet 52 that is included in each of IPv6 network packet fragments 60 may contain the same fields with the same values as IPv6 network packet header 54 in IPv6 network packet 52 with the exception of payload length field 58C. The payload length field 58C in each of IPv6 network packet fragments 60 may have a value that indicates the size of the payload of the fragment. Thus, payload length field 58C in IPv6 network packet fragment 60A may have a value that indicates the size of payload 64A, payload length field 58C in IPv6 network packet fragment 60B may have a value that indicates the size of payload 64B, and payload length field 58C in IPv6 network packet fragment 60C may have a value that indicates the size of payload 64C.

Each of fragment headers 62A-62N includes next header field 66A, fragment offset field 66B, identification field 66C, and more fragments field 66D. Next header field 66A contains a value that is the same for all fragments of the same IPv6 network packet 52. Fragment offset field 66B contains a value that is the offset of the fragment. Thus, the fragment offset field 66B may be zero for the first fragment of IPv6 network packet 52, such as IPv6 network packet fragment 60A, and may be non-zero for other fragments of IPv6 network packet 52, such as IPv6 network packet fragment 60B and IPv6 network packet fragment 60N. Identification field 66C contains a value that identifies the IPv6 network packet fragments of the same IPv6 network packet, and thus is the same for all IPv6 network packet fragments 60 of IPv6 network packet 52. More fragments field 66D is a flag that is set (e.g., have a value of one) for each fragment of IPv6 network packet 52 other than the last fragment.

Because each fragment of IPv6 network packet fragments 60 includes a different portion IPv4 network packet 40, only one fragment out of IPv6 network packet fragments 60 includes header 42 and transport protocol header 46 of IPv4 network packet 40. The fragment that includes header 42 and transport protocol header 46 of IPv4 network packet 40 is referred herein as the first fragment of IPv6 network packet 52.

As shown in FIG. 3B, IPv6 network packet fragment 60A is the first fragment of IPv6 network packet 52 because it includes header 42 and transport protocol header 46 of IPv4 network packet 40. In contrast, the remaining fragments of IPv6 network packet fragments 60, such as IPv6 network packet fragment 60B and IPv6 network packet fragment 60N, are not referred to as the first fragment because neither IPv6 network packet fragment 60B nor IPv6 network packet fragment 60N includes header 42 and transport protocol header 46 of IPv4 network packet 40. IPv6 network packet fragment 60N may be referred to as the last fragment of IPv6 network packet 52 because its more fragments field 66D is not set (i.e., has a value of 0).

Network device 10 may receive IPv6 network packet fragments 60, reassemble IPv6 network packet 52 from IPv6 network packet fragments 60, decapsulate IPv4 network packet 40 from IPv6 network packet 52, and forward IPv4 network packet 40 onto an IPv4 network, such as IPv4 network 4 shown in FIG. 1. In accordance with aspects of the present disclosure, network device 10 may be able to perform an anti-spoof check on IPv6 network packet 52 without reassembling IPv6 network packet 52 from IPv6 network packet fragments 60.

To perform an anti-spoof check on IPv6 network packet fragments 60, network device 10 by determining whether each of the IPv4 source network address 50A and the source port 50C of the IPv4 network packet 40 encapsulated in IPv6 network packet 52 is within an acceptable range as determined by the IPv6 source network address 58A of IPv6 network packet 52. If each of source network address 50F and source port 50H is each within a respective acceptable range, then IPv6 network packet fragments 60 passes the anti-spoof check.

However, only the first fragment (e.g., fragment 60A) of a fragment flow may contains the IPv4 source network address 50A and the source port 5C of the IPv4 network packet 40, and network device may not necessarily receive fragment 60A that contains the IPv4 source network address 50A and the source port 50C of the IPv4 network packet 40 before it receives other fragments of the fragment flow. If network device 10 receives one or more fragments of fragment flow other than fragment 60A before network device 10 receives fragment 60A, network device 10 may not be able to perform anti-spoof checks on the one or more fragments of the fragment flow that it has received. Instead, network device 10 may buffer the one or more fragments of the fragment flow that it has received in fragment buffer 28 until it receives fragment 60A that includes the IPv4 source network address 50A and the source port 50C of the IPv4 network packet 40. When network device 10 receives fragment 60A that includes the IPv4 source network address 50A and the source port 50C of the IPv4 network packet 40, network device 10 may be able to perform an anti-spoof check on the fragment flow based at least in part on the IPv4 source network address 50A and the source port 50C of the IPv4 network packet 40 included in fragment 60A, according to the techniques described throughout this disclosure. If the fragment flow passes the anti-spoof check, network device 10 may reassemble IPv6 network packet 52 from IPv6 network packet fragments 60, decapsulate IPv4 network packet 40 from IPv6 network packet 52, and forward IPv4 network packet 40 onto an IPv4 network, such as IPv4 network 4 shown in FIG. 1

As network device 10 receives, buffers, and encapsulates fragments 60 of a fragment flow associated with IPv6 network packet 52, the fragment flow may transition between different states. FIG. 4 is a block diagram illustrating the state transitions of an example fragment flow, according to the techniques described herein. As shown in FIG. 4, the state of a fragment flow may be new entry state 70, buffer state 72, spoof status available state 74, or drop state 76. New entry state 70 indicates that network device 10 has yet to receive any fragments 60 of the fragment flow. Buffer state 72 indicates that network device 10 is currently buffering fragments 60 that it receives but cannot yet perform an anti-spoof check on fragments 60. Spoof status available state 74 indicates that the network device 10 that it has performed an anti-spoof check on fragments 60 and has determined that fragments 60 has either passed or failed the anti-spoof check. Drop state 76 indicates that network device 10 is currently dropping any fragments 60 that it receives.

A fragment flow is in new entry state 70 until it receives a fragment of the fragment flow. When the fragment flow is in new entry state 70, the fragment flow may transition to buffer state 72 if network device 10 receives a mid fragment or a last fragment of the fragment flow, or may transition to encapsulation state 74 if network device 10 receives a first fragment of the fragment flow. When the fragment flow is in buffer state 72, network device 10 has yet to perform an anti-spoof check on the fragment flow. Thus, network device 10 may buffer the fragments of the fragment flow that it receives in fragment buffer 28. When network device 10 receives additional mid fragments or the last fragment of the fragment flow when the fragment flow is in buffer state 72, the fragment flow may remain in buffer state 72 and network device 10 may continue to buffer the fragments of the fragment flow it receives in fragment buffer 28.

Regardless of whether the fragment state is in new entry state 70 or buffer state 72, when network device 10 receives a first fragment of the fragment flow, where the first fragment of the fragment flow is the fragment that contains the source network address 50A and the source port 50C of the IPv4 network packet 40, network device 10 may perform an anti-spoof check on the fragment flow to determine whether the fragment flow passes or fails the anti-spoof check. If network device 10 determines that the fragment flow fails the anti-spoof check, network device 10 may drop the first fragment of the fragment flow as well as all fragments of the fragment flow network device 10 is currently buffering in fragment buffer 28. Network device 10 may store an indication of whether the fragment flow passes or fails the anti-spoof check as a spoof status for the fragment flow and may transition the fragment flow to spoof status available state 74.

When the fragment flow is in spoof status available state 74, network device 10 may continue to buffer additional fragments of the fragment flow that is received by network device 10 if the spoof status for the fragment flow indicates that the fragment flow passes the anti-spoof check. Network device may also drop additional fragments of the fragment flow that is received by network device 10 if the spoof status for the fragment flow indicates that the fragment flow fails the anti-spoof check If network device 10 determines that the fragment flow passes the anti-spoof check, network device 10 may reassemble the fragments of the fragment flow into an IPv6 network packet 52 once it has received all fragments of the fragment flow. Network device 10 may therefore decapsulate an IPv4 network packet 40 from the reassembled IPv6 network packet 52 and forward the IPv4 network packet 40 onto IPv4 network 4.

When the fragment is in new entry state 70, buffer state 72, or spoof status available state 74, the fragment flow may transition to a drop state 76 when the time elapsed for processing fragments of a fragment flow exceeds a reassembly time out, or when an error occurs. Examples of the length of time for a reassembly time out may be 30 seconds, 45 seconds, and the like. When the fragment flow is in drop state 76, network device 10 may drop any fragments of the fragment flow that it receives. Dropping a fragment may include network device 10 refraining from storing the fragment in fragment buffer 28.

FIGS. 5A-5D depict a flowchart illustrating an example process for performing an anti-spoof check on an IPv6 network packet that encapsulates an IPv4 network packet without reassembling the IPv6 network packet from IPv6 network packet fragments, according to techniques described herein. Such a process can be performed by a network device, such as network device 10, that is connected to an IPv4 network such as IPv4 network 4 and to an IPv6 network such as IPv6 network 6. Further, a given packet module, such as packet module 30A may concurrently perform the process described in FIGS. 5A-5D for different fragment flows, where the different fragment flows may be at different points in the process described in FIGS. 5A-5D at a given point in time.

Figure 5A:
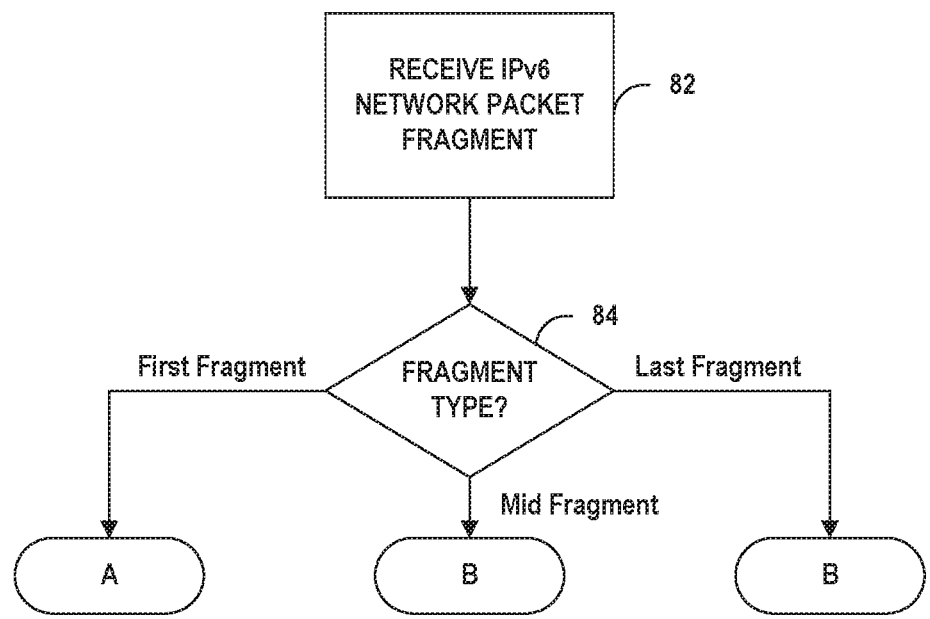
FIGS. 5A-5D depict a flowchart illustrating an example process for performing an anti-spoof check on an IPv6 network packet that encapsulates an IPv4 network packet without reassembling the IPv6 network packet from IPv6 network packet fragments, according to techniques described herein.

As shown in FIG. 5A, network device 10 may receive a fragment of an IPv6 network packet, such as one of fragments 60 of IPv6 network packet 52 that encapsulates IPv4 network packet 40, from IPv4 network 4 (82).

The fragments that network device 10 receives of the same IPv6 network packet may be part of the same fragment flow for IPv6 network packet 40. As discussed throughout this disclosure, network device 10 may buffer every fragment of a fragment flow associated with an IPv6 network packet that it receives until it receives a first fragment of the fragment flow. Once network device 10 receives the first fragment of the fragment flow, it has the necessary information, such as the source network address and the source port of the encapsulated IPv4 network address, to perform an anti-spoof check on the fragment flow. Thus, network device 10 determine the type of action to take in response to receiving a fragment of a fragment flow based at least in part on the type of the fragment it receives. Further, as discussed above with respect to FIG. 4, the type of action that network device 10 takes in response to receiving a fragment may also be based at least in part on the state of the fragment flow.

As such, when network device 10 receives a fragment of a fragment flow associated with IPv6 network packet 52, network device 10 may determine the fragment type of the fragment as well as the state of the fragment flow that the fragment is a part of in order to determine an action to perform in response to receiving the fragment. Network device 10 may determine the fragment type of a fragment as being one of: a first fragment (e.g., fragment 60A), a mid fragment (e.g., fragment 60B), or a last fragment (e.g., fragment 60N) of the fragment flow based at least in part on information contained in the fragment (84). For example, IFCs 22 of network device 10 may receive the fragment, and packet module 30 of network device 10 may determine the fragment type of the fragment.

Network device 10 may determine whether the fragment is a first fragment, mid fragment, or last fragment of the fragment flow based at least in part on the value of the fragment offset field 66B of the fragment and the more fragments field 66D in the fragment header of the fragment. In particular, network device 10 may determine that the fragment is a first fragment of the fragment flow if the value of fragment offset field 66B is equal to zero and if the more fragments field 66D is set (e.g., has a value of 1). Network device 10 may determine that the fragment is a mid fragment if the value of fragment offset field 66B is non-zero and the more fragments field 66D in is set. Network device 10 may determine that the fragment is a last fragment if the value of the fragment offset field 66B is non-zero and the more fragment field 66D is not set (e.g., has a value of 0).

Besides determining the type of the fragment, network device 10 may also determine the state of the fragment flow at the time network device 10 receives the fragment. The state of the fragment flow may also inform network device 10 as to the action it takes in response to receiving the fragment. A fragment flow may be in one of four states: new entry, buffer, spoof status available, or drop. A fragment flow may be in a new entry state when network device 10 has not yet received any fragments of the fragment flow. A fragment flow may be in a buffer state when it has received one or more fragments of the fragment flow, but has yet to receive the first fragment 60A of the fragment flow that includes the source network address 50A and the source port 50C for the IPv4 network packet 40. A fragment flow may be in a spoof status available state when it has received the first fragment 60A of the fragment flow and has performed a spoof status check on the fragment flow based on the first fragment 60A of the fragment flow. A fragment flow may be in a drop state when each fragment of the fragment flow is to be dropped by network device 10. For example, packet module 30 of network device 10 may determine the state of the fragment flow.

When the fragment flow is in a buffer state, network device 10 may be able to buffer any fragments of the fragment flow that it receives in fragment buffer 28, but may not be able to perform an anti-spoof check on the fragment flow based on the fragments of the fragment flow that it has received. When the flow state is in a spoof status available state, network device 10 may either buffer or drop fragments of the fragment flow that it receives based on the spoof status of the fragment flow. When the fragment flow is in a drop state, network device 10 may drop any fragments of the fragment flow that it receives.

Figure 5B:
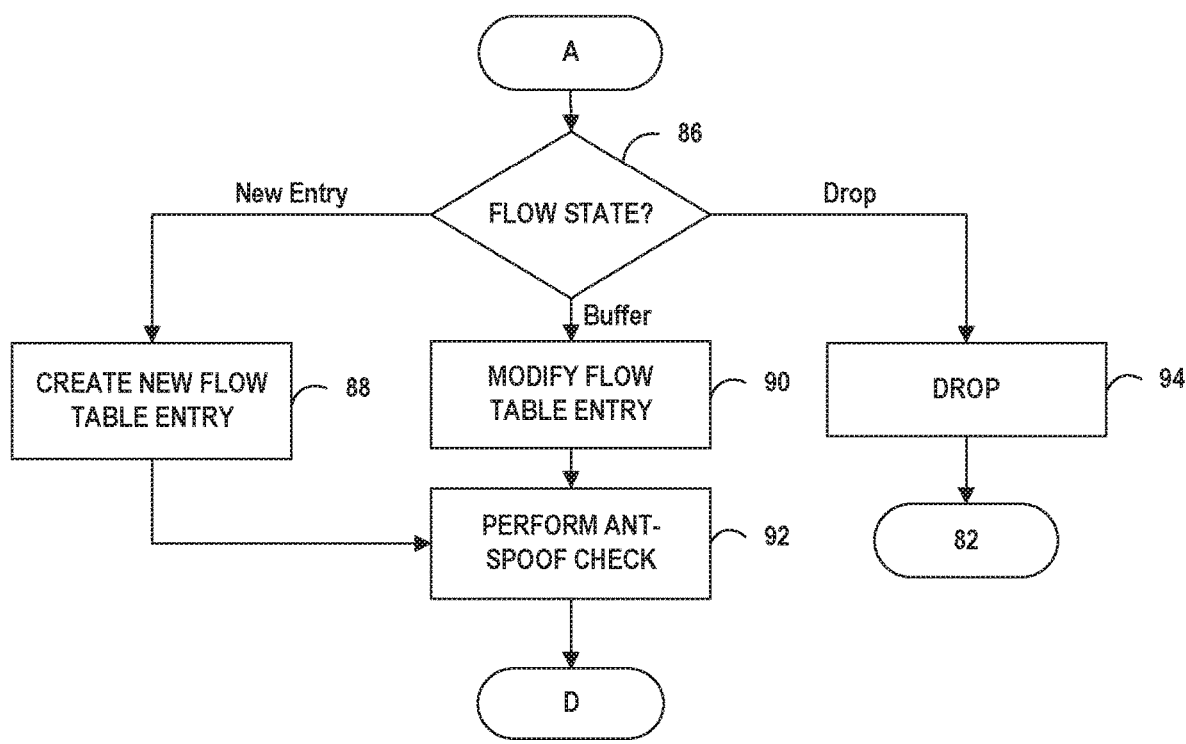

As shown in FIG. 5B, when the fragment is a first fragment 60A, network device 10 may determine the fragment flow for the fragment to be in one of the following flow states: new entry, buffer, or drop. (86). Because network device 10 cannot perform an anti-spoof check of the fragment flow until it has received the first fragment 60A of the fragment flow, the fragment flow cannot be in the spoof status available state until network device 10 receives the first fragment 60A of the fragment flow.

While FIGS. 5A and 5B illustrates that the fragment's type is determined before determining the state of the fragment flow, such determinations may occur in any order, or may occur simultaneously. For example, network device 10 may determine the state of the fragment flow for the fragment prior to determining the fragment type of the fragment.

Network device 10 may determine the state of the fragment flow by performing a lookup into flow table 32 to determine whether flow table 32 includes an entry for the particular fragment flow and, if so, determine the value of the state field of the flow table entry for the fragment flow. Network device 10 may perform the lookup into flow table 32 by indexing into flow table 32 using a key that network device 10 may generate based at least in part on contents of the fragment that together uniquely identify the fragment flow compared with other fragment flows. In particular, network device 10 may generate the key based at least in part on: the IPv6 source network address 58A, the value of the next header field 66A, and the value of the fragment identification field 66C. For example, network device 10 may hash the IPv6 source network address 58A, the value of the next header field 66A, and the value of the fragment identification field 66C to generate a key that is unique for the fragment flow and that is used to index into flow table 32 to lookup the flow table entry for the fragment flow.

Network device 10 may determine the fragment flow to be in the new entry state when flow table 32 does not include an entry for the fragment flow. In response to determining that the fragment is a first fragment 60A and that the state of the fragment flow is new entry, network device 10 may create an entry for the fragment flow in flow table 32 for the fragment flow (88). For example, packet module 30 of network device 10 may create the entry for the fragment flow in flow table 32 and update the fields of the entry in flow table 32. As discussed above, an entry for a fragment flow associated with an IPv6 network packet may include a state field ("State"), a spoof result field ("SPOOF_RE-SULT"), a queued bytes field ("QUED_BYTS"), a dropped bytes field ("DROPPED_BYTS"), a total length field ("TO-TAL_BYTS"), and a timer field ("Timer"). The state field may store a value that indicates the state of the fragment flow, such as to indicate buffer state, spoof status available state, or drop state.

The spoof result field may store a value indicative of the fragment flow passing the anti-spoof check (e.g., "PASS") or failing the anti-spoof check (e.g., "FAIL"). Because packet module 30 may not perform an anti-spoof check on the fragment flow until network device 10 receives the first fragment 60A of IPv6 network packet 52, the spoof result field may be empty until packet module 30 has performed the anti-spoof check on the fragment flow.

The queued bytes field may store a value indicative of the total size of the fragments of the fragment flow currently being buffered by packet module 30 in fragment buffer 28. Each time packet module 30 receives and buffers a fragment of the fragment flow in fragment buffer 28, packet module 30 may increment the value of the queued bytes field by the size of the buffered fragment as indicated by the value of payload length field 58C in the fragment.

The dropped bytes field may store a value indicative of the total size of the fragments of the fragment flow that packet module 30 has dropped. Packet module 30 may drop fragments of the fragment flow if the spoof result field indicates that the fragment flow has failed the anti-spoof check, if packet module 30 encounters the fragments while the fragment flow is in the drop state, or if the amount of time that has elapsed during processing of the fragment flow exceeds a reassembly timeout.

The total length field may store a value indicative of the total size of all of the fragments of the fragment flow. When packet module 30 receives the last fragment 60N of the fragment flow, packet module 30 may be able to determine the total size of all of the fragments of the fragment flow based on the value of the fragment offset field 66B of the last fragment 60N and the size of the last fragment, such as indicated by the value of the payload length field 58C in last fragment 60N. The sizes of the fragments indicated by the values of the sent bytes field, queued bytes field, dropped bytes field, and total length field may not include the size of the IPv6 network packet header 54C nor the fragment headers 62A-62N included in the fragments 60. As such, the values of the queued bytes field, dropped bytes field, and total length field may indicate the size of the payloads 64A-64N of the fragments 60 buffered by network device 10, the size of the payloads 64A-64N of the fragments 60 dropped by network device 10, and the size of the payloads 64A-64N of all of the fragments 60 making up the fragment flow, respectively.

The timer field may store a value indicative of the amount of time that has elapsed during processing of the fragment flow. As packet module 30 receives fragments of the fragment flow, packet module 30 may update the value of the timer field with the amount of that that has elapsed during processing of the fragment flow. If the amount of time that has elapsed during processing of the fragment flow exceeds a reassembly time out value, packet module 30 may cease processing of the fragments of the fragment flow.

When network device 10 receives the first fragment 60A of the fragment flow, network device 10 may transition the fragment flow from new entry state to spoof status available state by setting the state field of the fragment flow's entry in flow table 32 to a value that indicates the spoof status available state. Network device 10 may also set the value of the queued bytes field and the total length field to zero.

Because network device 10 can perform anti-spoof checks once it receives the first fragment 60A, network device 10 may proceed to perform anti-spoof check on the fragment flow once it has received first fragment 60A, according to the techniques discussed throughout this disclosure (92). For example, network device 10 may determine whether the source network address 50A and the source port 50C of IPv4 network packet 40 fall within acceptable ranges. To determine the values of acceptable ranges for the source network address 50A and the source port 50C of IPv4 network packet 50, network device 10 may extract an embedded IPv4 network address and a Port Set Identifier (PSID) from the IPv6 source network address 58A of the IPv6 network packet 52 based on one or more matching Mapping of Address and Port (MAP) rules. The embedded IPv4 network address and the PSID extracted from the IPv6 source network address 58A of the IPv6 network packet 52 may represent the values of acceptable ranges for the source network address 50A and the source port 50C of the IPv4 network packet 40.

Once network device 10 has performed an anti-spoof check on the fragment flow, network device 10 may update the spoof result field of the entry associated with the fragment flow in flow table 32 with a value that indicates whether the fragment flow passes the anti-spoof check (e.g., "PASS") or fails the anti-spoof check (e.g., "FAIL"). Network device 10 may proceed to take one or more actions based on the result of performing the anti-spoof check on the fragment flow, as shown in further detail in FIG. 5D.

Figure 5C:
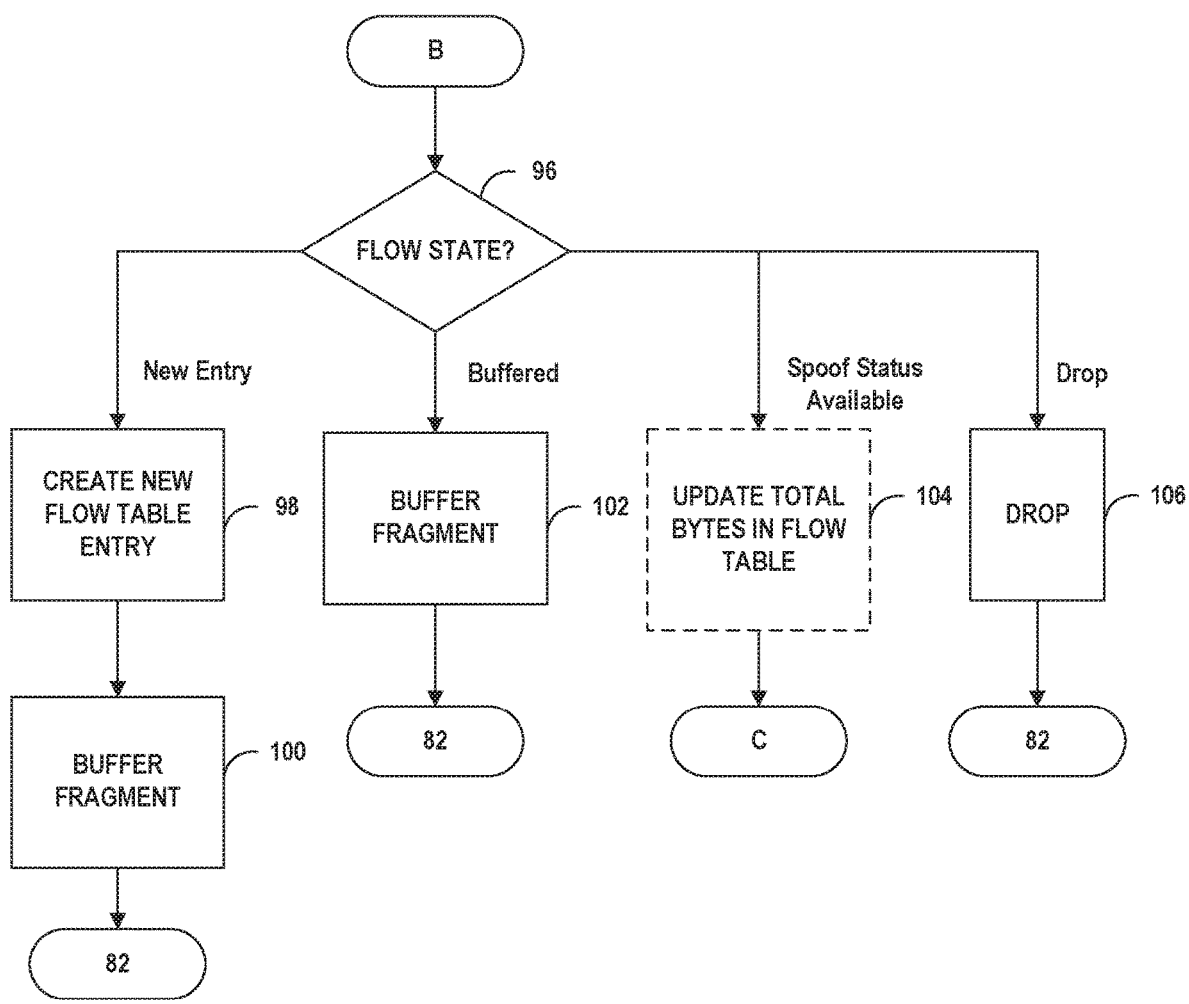
Figure 5D:
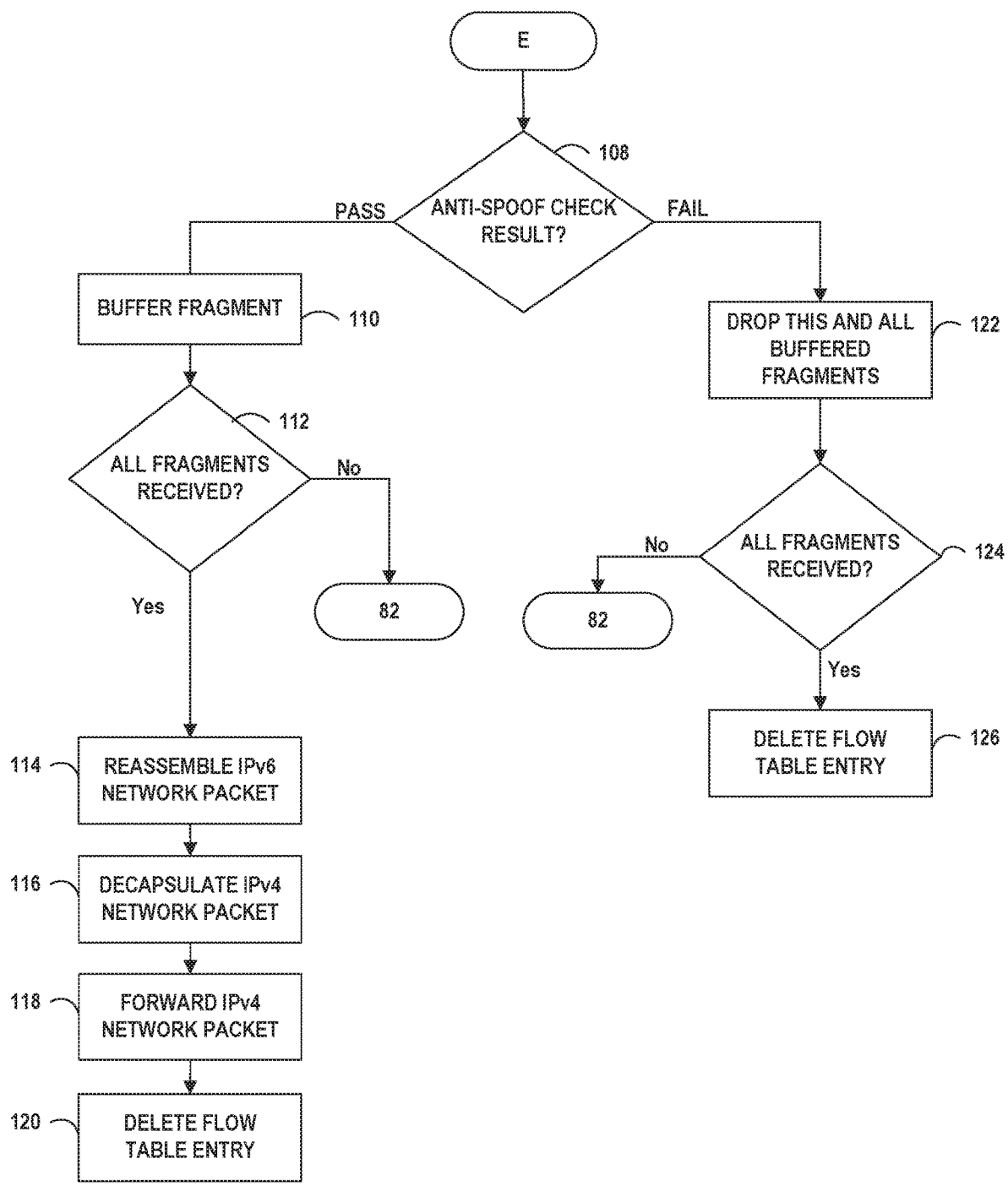

As shown in FIG. 5D, network device 10 may determine whether the fragment flow passes or fails the anti-spoof check, such as based on the value of the spoof result field in the entry associated with the fragment flow in flow table 32 (108). If the fragment fails the anti-spoof check, network device 10 may drop the fragment as well as all previously received fragments of the same fragment flow that are currently being buffered in fragment buffer 28 (122).

Network device 10 may set the value of the dropped bytes field in the entry associated with the fragment flow in flow table 32 as the total size of the fragments that network device 10 has dropped. Because network device 10 drops the fragment as well as all previously received fragments of the same fragment flow that are currently being buffered in fragment buffer 28, network device 10 may set the value of the dropped bytes field to the sum of the value of the queued bytes field and the value of payload length field 58C in the current fragment. Network device 10 may also set the values of the queued bytes field to zero.

Network device 10 may determine whether it should delete the fragment flow's entry in flow table 32. Network device 10 may delete the fragment flow's entry if it has received every fragment making up the fragment flow. Because the fragment has failed the anti-spoof check, network device 10 should have dropped every fragment of the fragment flow it has received. If network device 10 has received and dropped every fragment of the fragment flow, the total size of all of the fragments it has dropped as specified in the dropped bytes field should be the same as the total size of all of the fragments of the fragment flow as specified in the total length field.

Thus, network device 10 may determine if it has received every fragment of the fragment flow by comparing the value of the total length field to the dropped bytes field (124). If the value of the total length field is greater than zero, and if the value of the total length field equals the value of the dropped bytes field, then network device 10 may determine it has received every fragment of the fragment flow, and may delete the fragment flow's entry in flow table 32 (126).

On the other hand, if network device 10 determines it has not yet received every fragment of the fragment flow, network device 10 may refrain from deleting the fragment flow's entry in flow table 32 and may instead await receipt of additional IPv6 network packet fragments 60 that carry fragments of the fragment flow at step 82 shown in FIG. 5A.

When the fragment flow passes the anti-spoof check, network device 10 may buffer the currently received fragment in fragment buffer 28 (110), including updating the entry for the fragment flow in flow table 32 by adding the size of the fragment to the current value of the queued bytes field. Network device 10 may proceed to determine whether it has received all fragments of the fragment flow (112). To determine whether it has received all fragments of the fragment flow, network device 10 may determine if the value of the total length field is greater than zero and if the value of the total length field is the same as the value of the queued bytes field. If so, network device 10 may determine that it has received all fragments of the fragment flow.

Because network device 10 may have to receive all fragments of the fragment flow in order to reassemble IPv6 network packet from the fragments of the fragment flow, if network device 10 determines that it has not received all fragments of the fragment flow, network device 10 may await receipt of additional IPv6 network packet fragments 60 that carry fragments of the fragment flow at step 82 shown in FIG. 5A.

On the other hand, if network device 10 determines that it has received all fragments of the fragment flow, network device 10 may reassemble IPv6 network packet from the fragments of the fragment flow (114). Network device 10 may decapsulate the IPv4 network packet encapsulated by the reassembled IPv6 network packet (116) and may forward the decapsulated IPv4 network packet onto IPv4 network 4 to its destination (118). Network device 10 may delete the flow table entry associated with the fragment table in flow table 32 (120).

Referring back to FIG. 5B, if the current fragment is a first fragment of the fragment flow, and if flow table 32 includes an entry for the fragment flow, then the state field of the entry for the format flow may indicate whether the fragment flow is in a buffer state or whether the state of the fragment flow is in a drop state. As discussed above, a fragment flow may be in a buffer state when the network device 10 has already received and buffered one or more fragments of the fragment flow.

In response to determining that the current fragment is a first fragment of the fragment flow, and that the fragment flow is in a buffer state, network device 10 may transition the fragment flow to the spoof status available state and may update the entry for the fragment flow in flow table 32 based on the first fragment (90). Network device 10 may update the value of the state field of the fragment flow to indicate a spoof status available state. Because receiving the first fragment of the fragment flow enables network device 10 to proceed to perform anti-spoof checks on the fragment flow (92). Once network device 10 has performed an anti-spoof check on the fragment flow, network device 10 may update the spoof result field with a value that indicates whether the fragment flow passes the anti-spoof check (e.g., "PASS") or fails the anti-spoof check (e.g., "FAIL"). Network device 10 may proceed to take one or more actions based on the result of performing the anti-spoof check on the fragment flow, as shown in further detail in FIG. 5D.

In response to determining that the current fragment is a first fragment of the fragment flow, and that the fragment flow is in a drop state, network device 10 may drop the fragment (i.e., refrain from storing the fragment in fragment buffer 28) (94). In response to dropping the fragment, network device 10 may await receipt of additional IPv6 network packet fragments 60 at step 82 shown in FIG. 5A.

As discussed above, a fragment may be a first fragment, a mid fragment, or a last fragment. As shown in FIG. 5C, when the fragment is a mid fragment or a last fragment, network device 10 may determine the state of the fragment flow for the fragment and may perform one or more actions based at least in part on the state of the fragment flow (96). When network device 10 receives a fragment that is a mid fragment or a last fragment, the fragment flow state may be in one of: a new entry state, a buffer state, a spoof status available state, or a drop state.

As discussed above with respect to FIG. 5B, network device 10 may determine the state of the fragment flow by performing a lookup into flow table 32 to determine whether flow table 32 includes an entry for the particular fragment flow and, if so, determine state of the fragment flow based on the value of the state field in the flow table entry for the fragment flow.

If flow table 32 does not include an entry for the fragment flow, then network device 10 may determine the fragment flow to be in the new entry state regardless of whether the current fragment is a first fragment, a mid fragment, or a last fragment. In response to determining that the fragment is a mid fragment or a last fragment and that the state of the fragment flow is new entry, network device 10 may create an entry for the fragment flow in flow table 32 for the fragment flow (98). Upon creating the entry for the fragment flow in flow table 32, network device 10 may update the values of one or more fields of the entry. Because network device 10 has not received the first fragment of the fragment flow, the fragment flow state transitions from a new entry state to a buffer state when the network device 10 receives a mid fragment or a last fragment of the fragment flow. Thus, network device 10 may set the value of the state field of the entry for the fragment flow in flow table 32 to indicate a buffer state. Network device 10 may also set the value of the dropped bytes field of the entry in flow table 32 to zero, as the fragment flow has yet to pass or fail the anti-spoof check.

When the fragment received by network device 10 is a last fragment of the fragment flow, such as fragment 60N, network device 10 may be able to determine the total size of all of the fragments of the fragment flow based at least in part on the value of fragment offset field 66B and the value of the payload length field 58C included in the last fragment. In one example, the total size of all of the fragments of the fragment flow may be determined by adding the value of the payload length field 58C of the last fragment to the result of multiplying the value of the fragment offset field 66B of the last fragment by eight. Network device 10 may update the value of the total length field of the entry with the total size of all fragments of the fragment flow. When the fragment received by network device 10 is a mid fragment, network device 10 may set the value of the total size field to zero.

Network device 10 may proceed to buffer the fragment in fragment buffer 28 (100) and to await receipt of additional IPv6 network packet fragments 60 at step 82 shown in FIG. 5A. When the fragment flow is currently in the buffer state, network device 10 operates to buffer fragments it receives in the fragment buffer while it remains in the buffer state. Because the fragment flow is now in a buffer state, network device 10 may buffer the fragment in fragment buffer 28 (102). As network device 10 buffers fragments of a fragment flow, network device 10 may update the fragment flow's entry in flow table 32 to reflect the size of the fragments that are currently buffered in fragment buffer 28 of network device 10. Thus, because the mid fragment or the last fragment received by network device 10 is currently the only fragment of the fragment flow being buffered in fragment buffer 28, network device 10 may set the value of the queued bytes field in the entry for the fragment flow in flow table 32 to indicate the value of the payload length field 58C of the mid fragment or last fragment that it has received and buffered. Upon buffering the fragment in fragment buffer 28, network device 10 may await receipt of additional IPv6 network packet fragments 60 at step 82 shown in FIG. 5A.

If the fragment received by network device 10 is a mid fragment or a last fragment of the fragment flow, and if flow table 32 includes an entry for the fragment flow, then the fragment flow is either in a buffer state, a spoof status available state, or a drop state. As discussed above, the state field in the fragment flow's entry in flow table 32 indicates whether the fragment flow is in the buffer state, the spoof status available state, or the drop state. When the fragment flow is in the drop state, network device 10 may drop the fragment it has received (i.e., refrain from buffering the fragment in fragment buffer 28) (106). Upon dropping the fragment, network device 10 may await receipt of additional IPv6 network packet fragments 60 at step 82 shown in FIG. 5A.

When the fragment received by network device 10 is a mid fragment or a last fragment of the fragment flow, if the fragment flow is in a buffer state, network device 10 may buffer the fragment it has received in fragment buffer 28 and may update the fragment flow's entry in flow table 32 (102). Network device 10 may update the queued bytes field in the entry to add the value of the payload length field 58C of the mid fragment or last fragment that it has received and buffered. Network device 10 may also be able to determine the total size of all of the fragments of the fragment flow based at least in part on the value of fragment offset field 66B and the value of the payload length field 58C included in the last fragment. In one example, the total size of all of the fragments of the fragment flow may be determined by adding the value of the payload length field 58C of the last fragment to the result of multiplying the value of the fragment offset field 66B of the last fragment by eight. Network device 10 may update the value of the total length field of the entry with the total size of all fragments of the fragment flow. Upon buffering the fragment in fragment buffer 28, network device 10 may await receipt of additional IPv6 network packet fragments 60 at step 82 shown in FIG. 5A.

The fragment flow is in a spoof status available state if network device 10 has previously received the first fragment of the fragment flow. When the fragment is a last fragment of the fragment flow, network device 10 may be able to determine the total size of all of the fragments of the fragment flow based at least in part on the value of fragment offset field 66B and the value of the payload length field 58C included in the last fragment. In one example, the total size of all of the fragments of the fragment flow may be determined by adding the value of the payload length field 58C of the last fragment to the result of multiplying the value of the fragment offset field 66B of the last fragment by eight. Network device 10 may update the value of the total length field of the entry with the total size of all fragments of the fragment flow. When the fragment received by network device 10 is a mid fragment, network device 10 may set the value of the total size field to zero (104).

When the fragment is a mid fragment or a last fragment of the fragment flow, and if the fragment flow is in a spoof status available state, network device 10 may proceed to take one or more actions based on the result of performing the anti-spoof check on the fragment flow, as shown in further detail in FIG. 5D. In this way, network device 10 may be able to receive IPv6 network packet fragments 60 that encapsulate an IPv6 network packet 52 and to perform an anti-spoof check on IPv6 network packet 52 without reassembling IPv6 network packet 52 from IPv6 network packet fragments 60.

Figure 6:
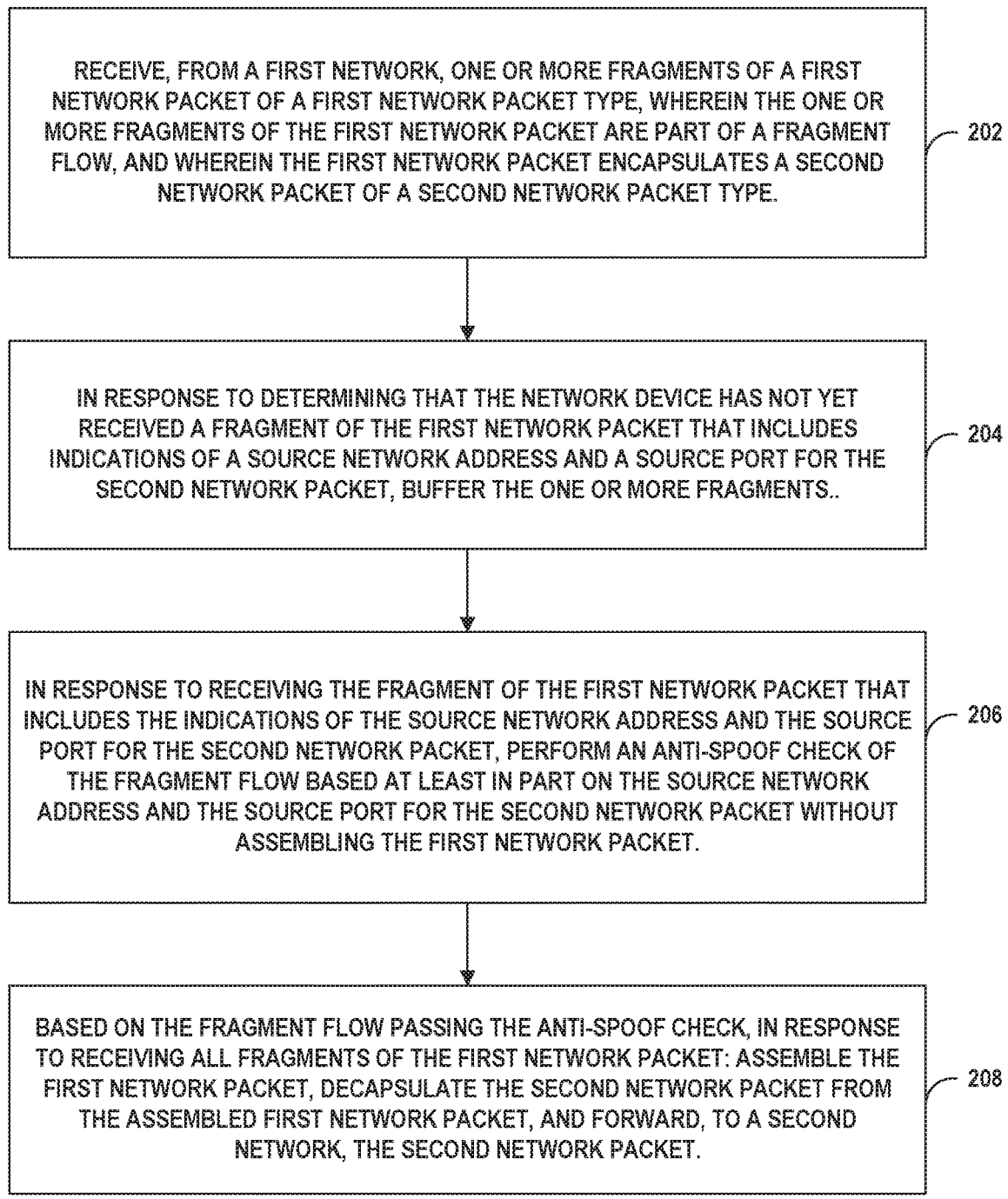
FIG. 6 is a flowchart illustrating an example process for performing an anti-spoof check on a fragment flow associated with an IPv6 network packet without reassembling the IPv6 packet, according to techniques described herein.

FIG. 6 is a flowchart illustrating an example process for performing an anti-spoof check on a fragment flow associated with an IPv6 network packet without reassembling the IPv6 packet, according to techniques described herein. As shown in FIG. 6, network device 10 may receive, from a first network, one or more fragments of a first network packet of a first network packet type, wherein the one or more fragments of the first network packet are part of a fragment flow, and wherein the first network packet encapsulates a second network packet of a second network packet type (202).

In some examples, the first network packet of the first network packet type is an Internet Protocol version 6 (IPv6) network packet, such as IPv6 network packet 52. In some examples, the second network packet of the second network packet type is an Internet Protocol version 4 (IPv4) network packet such as IPv4 network packet 40. In some examples, the first network is an IPv6 network such as IPv6 network 6. In some examples, the second network is an IPv4 network such as IPv4 network 4.

Network device 10 may, in response to determining that the network device has not yet received a fragment of the first network packet that includes indications of a source network address and a source port for the second network packet, buffer the one or more fragments, such as in a fragment buffer 28 (204).

In some examples, network device 10 may, in response to receiving an initial fragment of the first network packet, creating, by the network device, an entry associated with the fragment flow in a flow table 32. Network device 10 may, in response to determining that the one or more fragments of the first network packet do not include the fragment of the fragment flow that includes the indication of the source port of the network packet of the second network packet type, transition the fragment flow to a buffer state by updating the entry for the fragment flow in the flow table 32 to indicate that the fragment flow is in a buffer state, where the buffer state indicates that the network device has not yet received the fragment of the first network packet that includes the indications of the source network address and the source port for the second network packet. In some examples, network device 10 may, in response to receiving the fragment of the first network packet that includes the indications of the source network address and the source port for the second network packet, transition the fragment flow from the buffer state to a spoof status available state by updating the entry for the fragment flow in the flow table 32 to indicate that the fragment flow is in the spoof status available state, where the spoof status available state indicates that the network device is able to perform the anti-spoof check on the fragment of the first network packet that includes the indications of a source network address and source port for the second network packet to determine whether the fragment flow passes the anti-spoof check.

Network device 10 may, in response to receiving the fragment of the first network packet that includes the indications of the source network address and the source port for the second network packet, perform an anti-spoof check of the fragment flow based at least in part on the source network address and the source port for the second network packet without assembling the first network packet (206). In some examples, network device 10 may determine that the fragment of the first network packet includes the indications of the source network address and the source port for the second network packet based at least in part on a value of a fragment offset field 66B in a fragment header 62A of the fragment 60A.

In some examples, to perform the anti-spoof check of the fragment flow, network device 10 may determine an acceptable range of values for the source network address and the source port based at least in part on a network address of the first network packet and performing the anti-spoof check of the fragment flow based at least in part on the source network address and the source port for the second network packet includes determining whether the source network address and the source port for the second network packet are within the acceptable range of values.

In some examples, network device 10 may, subsequent to performing the anti-spoof check on the fragment flow, receive a second one or more fragments of the first network packet. Network device 10 may, based on the fragment flow passing the anti-spoof check, buffer the second one or more fragments of the first network packet in the fragment buffer 28 without performing the anti-spoof check on any of the second one or more fragments of the first network packet.

Network device 10 may, based on the fragment flow passing the anti-spoof check, in response to receiving all fragments of the first network packet: assemble the first network packet, decapsulate the second network packet from the assembled first network packet, and forward, to a second network, the second network packet (208).

In some examples, network device 10 may receive, from the first network, such as IPv6 network 6, one or more fragments of a third network packet of the first network packet type, such as an IPv6 network packet, wherein the one or more fragments of the third network packet are part of a second fragment flow, and wherein the third network packet encapsulates a fourth network packet of the second network packet type, such as an IPv4 network packet. In some examples, network device 10 may, in response to determining that the network device 10 has not yet received a fragment of the third network packet that includes indications of a source network address and a source port for the fourth network packet, buffer the one or more fragments of the second fragment flow. In some examples, network device 10 may, in response to receiving the fragment of the third network packet that includes the indications of the source network address and the source port for the fourth network packet, perform an anti-spoof check of the second fragment flow based at least in part on the source network address and the source port for the fourth network packet without assembling the third network packet. In some examples, network device 10 may, based on the second fragment flow failing the anti-spoof check, drop all fragments of the second fragment flow without assembling the third network packet.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
    receiving, by a network device from a first network, one or more fragments of a first network packet of a first network packet type, wherein the one or more fragments of the first network packet are part of a fragment flow, and wherein the first network packet encapsulates a second network packet of a second network packet type;

in response to determining that the network device has not yet received a fragment of the first network packet that includes indications of a source network address and a source port for the second network packet, buffering, by the network device, the one or more fragments;

in response to receiving the fragment of the first network packet that includes the indications of the source network address and the source port for the second network packet, performing, by the network device, an anti-spoof check of the fragment flow based at least in part on the source network address and the source port for the second network packet without assembling the first network packet;

subsequent to performing the anti-spoof check on the fragment flow, receiving, by the network device, a second one or more fragments of the first network packet;

based on the fragment flow passing the anti-spoof check, buffering, by the network device, the second one or more fragments of the first network packet in the fragment buffer without performing the anti-spoof check on any of the second one or more fragments of the first network packet; and based on the fragment flow passing the anti-spoof check, in response to receiving all fragments of the first network packet:
  assembling, by the network device, the first network packet,
  decapsulating, by the network device, the second network packet from the assembled first network packet, and
  forwarding by the network device to a second network, the second network packet.

2. The method of claim 1, further comprising:
receiving, by the network device from the first network, one or more fragments of a third network packet of the first network packet type, wherein the one or more fragments of the third network packet are part of a second fragment flow, and wherein the third network packet encapsulates a fourth network packet of the second network packet type;

in response to determining that the network device has not yet received a fragment of the third network packet that includes indications of a source network address and a source port for the fourth network packet, buffering, by the network device, the one or more fragments of the second fragment flow;

in response to receiving the fragment of the third network packet that includes the indications of the source network address and the source port for the fourth network packet, performing, by the network device, an anti-spoof check of the second fragment flow based at least in part on the source network address and the source port for the fourth network packet without assembling the third network packet; and based on the second fragment flow failing the anti-spoof check, dropping all fragments of the second fragment flow without assembling the third network packet.

3. The method of claim 1, further comprising:
in response to receiving an initial fragment of the first network packet, creating, by the network device, an entry associated with the fragment flow in a flow table;

in response to determining that the one or more fragments of the first network packet do not include the fragment of the fragment flow that includes the indication of the source port of the network packet of the second network packet type, transitioning, by the network device the fragment flow to a buffer state by updating the entry for the fragment flow in the flow table to indicate that the fragment flow is in the buffer state, wherein the buffer state indicates that the network device has not yet received the fragment of the first network packet that includes the indications of the source network address and the source port for the second network packet; and in response to receiving the fragment of the first network packet that includes the indications of the source network address and the source port for the second network packet, transitioning, by the network device, the fragment flow from the buffer state to a spoof status available state by updating the entry for the fragment flow in the flow table to indicate that the fragment flow is in the spoof status available state, wherein the spoof status available state indicates that the network device is able to perform the anti-spoof check on the fragment of the first network packet that includes the indications of a source network address and source port for the second network packet to determine whether the fragment flow passes the anti-spoof check.

4. The method of claim 1, further comprising:
determining, by the network device, that the fragment of the first network packet includes the indications of the source network address and the source port for the second network packet based at least in part on a value of a fragment offset field in a fragment header of the fragment.

5. The method of claim 1, further comprising:
determining, by the network device, an acceptable range of values for the source network address and the source port based at least in part on a network address of the first network packet,
wherein performing the anti-spoof check of the fragment flow based at least in part on the source network address and the source port for the second network packet includes determining, by the network device, whether the source network address and the source port for the second network packet are within the acceptable range of values.

6. The method of claim 1, wherein:
the first network packet of the first network packet type is an Internet Protocol version 6 (IPv6) network packet;
the second network packet of the second network packet type is an Internet Protocol version 4 (IPv4) network packet;
the first network is an IPv6 network; and
the second network is an IPv4 network.

7. A network device comprising:
one or more network interfaces configured to receive, from a first network, one or more fragments of a first network packet of a first network packet type, wherein the one or more fragments of the first network packet are part of a fragment flow, and wherein the first network packet encapsulates a second network packet of a second network packet type; and one or more processors configured to:
  in response to determining that the one or more network interfaces has not yet received a fragment of the first network packet that includes indications of a source network address and a source port for the second network packet, buffer the one or more fragments;

in response to the one or more network interfaces receiving the fragment of the first network packet that includes the indications of the source network address and the source port for the second network packet, perform an anti-spoof check of the fragment flow based at least in part on the source network address and the source port for the second network packet without assembling the first network packet;

wherein the one or more network interfaces are further configured to, subsequent to the one or more processors performing the anti-spoof check on the fragment flow, receive a second one or more fragments of the first network packet;

wherein the one or more processors are further configured to:

based on the fragment flow passing the anti-spoof check, buffer the second one or more fragments of the first network packet in the fragment buffer without performing the anti-spoof check on any of the second one or more fragments of the first network packet; and based on the fragment flow passing the anti-spoof check, in response to receiving all fragments of the first network packet:
assemble the first network packet, and
decapsulate the second network packet from the assembled first network packet;

wherein the one or more network interfaces are further configured to forward the second network packet to a second network.

8. The network device of claim 7, wherein:
the one or more network interfaces are further configured to receive, from the first network, one or more fragments of a third network packet of the first network packet type, wherein the one or more fragments of the third network packet are part of a second fragment flow, and wherein the third network packet encapsulates a fourth network packet of the second network packet type;

the one or more processors are further configured to:
in response to determining that the network device has not yet received a fragment of the third network packet that includes indications of a source network address and a source port for the fourth network packet, buffer the one or more fragments of the second fragment flow;

in response to receiving the fragment of the third network packet that includes the indications of the source network address and the source port for the fourth network packet, perform an anti-spoof check of the second fragment flow based at least in part on the source network address and the source port for the fourth network packet without assembling the third network packet; and based on the second fragment flow failing the anti-spoof check, drop all fragments of the second fragment flow without assembling the third network packet.

9. The network device of claim 7, wherein the one or more processors are further configured to:
in response to the one or more network interfaces receiving an initial fragment of the first network packet, create an entry associated with the fragment flow in a flow table;

in response to determining that the one or more fragments of the first network packet do not include the fragment of the fragment flow that includes the indication of the source port of the network packet of the second network packet type, transition the fragment flow to a buffer state by updating the entry for the fragment flow in the flow table to indicate that the fragment flow is in the buffer state, wherein the buffer state indicates that the network device has not yet received the fragment of the first network packet that includes the indications of the source network address and the source port for the second network packet; and in response to receiving the fragment of the first network packet that includes the indications of the source network address and the source port for the second network packet, transition the fragment flow from the buffer state to a spoof status available state by updating the entry for the fragment flow in the flow table to indicate that the fragment flow is in the spoof status available state, wherein the spoof status available state indicates that the network device is able to perform the anti-spoof check on the fragment of the first network packet that includes the indications of a source network address and source port for the second network packet to determine whether the fragment flow passes the anti-spoof check.

10. The network device of claim 7, wherein the one or more processors are further configured to determine that the fragment of the first network packet includes the indications of the source network address and the source port for the second network packet based at least in part on a value of a fragment offset field in a fragment header of the fragment.

11. The network device of claim 7, wherein the one or more processors are further configured to determine an acceptable range of values for the source network address and the source port based at least in part on a network address of the first network packet,
wherein to perform the anti-spoof check of the fragment flow based at least in part on the source network address and the source port for the second network packet the one or more processors are further configured to determine whether the source network address and the source port for the second network packet are within the acceptable range of values.

12. The network device of claim 7, wherein:
the first network packet of the first network packet type is an Internet Protocol version 6 (IPv6) network packet;
the second network packet of the second network packet type is an Internet Protocol version 4 (IPv4) network packet;
the first network is an IPv6 network; and
the second network is an IPv4 network.

13. A computer-readable medium comprising instructions for causing a programmable processor to:
receive, from a first network, one or more fragments of a first network packet of a first network packet type, wherein the one or more fragments of the first network packet are part of a fragment flow, and wherein the first network packet encapsulates a second network packet of a second network packet type;

in response to determining that a fragment of the first network packet that includes indications of a source network address and a source port for the second network packet has not yet been received, buffer the one or more fragments;

in response to receiving the fragment of the first network packet that includes the indications of the source network address and the source port for the second network packet, perform an anti-spoof check of the fragment flow based at least in part on the source network address and the source port for the second network packet without assembling the first network packet;
subsequent to performing the anti-spoof check on the fragment flow, receive a second one or more fragments of the first network packet;
based on the fragment flow passing the anti-spoof check, buffer the second one or more fragments of the first network packet in the fragment buffer without performing the anti-spoof check on any of the second one or more fragments of the first network packet; and
based on the fragment flow passing the anti-spoof check, in response to receiving all fragments of the first network packet:
assemble the first network packet,
decapsulate the second network packet from the assembled first network packet, and
forward, to a second network, the second network packet.

14. The computer-readable medium of claim 13, wherein the instructions cause the programmable processor to:
receive, from the first network, one or more fragments of a third network packet of the first network packet type, wherein the one or more fragments of the third network packet are part of a second fragment flow, and wherein the third network packet encapsulates a fourth network packet of the second network packet type;
in response to determining that the network device has not yet received a fragment of the third network packet that includes indications of a source network address and a source port for the fourth network packet, buffer the one or more fragments of the second fragment flow;
in response to receiving the fragment of the third network packet that includes the indications of the source network address and the source port for the fourth network packet, perform an anti-spoof check of the second fragment flow based at least in part on the source network address and the source port for the fourth network packet without assembling the third network packet; and
based on the second fragment flow failing the anti-spoof check, drop all fragments of the second fragment flow without assembling the third network packet.

15. The computer-readable medium of claim 13, wherein the instructions cause the programmable processor to:
in response to receiving an initial fragment of the first network packet, create an entry associated with the fragment flow in a flow table;
in response to determining that the one or more fragments of the first network packet do not include the fragment of the fragment flow that includes the indication of the source port of the network packet of the second network packet type, transition the fragment flow to a buffer state by updating the entry for the fragment flow in the flow table to indicate that the fragment flow is in the buffer state, wherein the buffer state indicates that the fragment of the first network packet that includes the indications of the source network address and the source port for the second network packet has not yet been received; and
in response to receiving the fragment of the first network packet that includes the indications of the source network address and the source port for the second network packet, transition the fragment flow from the buffer state to a spoof status available state by updating the entry for the fragment flow in the flow table to indicate that the fragment flow is in the spoof status available state, wherein the spoof status available state indicates that the network device is able to perform the anti-spoof check on the fragment of the first network packet that includes the indications of a source network address and source port for the second network packet to determine whether the fragment flow passes the anti-spoof check.

16. The computer-readable medium of claim 13, wherein the instructions cause the programmable processor to:
determine that the fragment of the first network packet includes the indications of the source network address and the source port for the second network packet based at least in part on a value of a fragment offset field in a fragment header of the fragment.

17. The computer-readable medium of claim 13, wherein the instructions cause the programmable processor to:
determine an acceptable range of values for the source network address and the source port based at least in part on a network address of the first network packet,
wherein the instructions that cause the programmable processor to perform the anti-spoof check of the fragment flow based at least in part on the source network address and the source port for the second network packet further causes the programmable processor to determine whether the source network address and the source port for the second network packet are within the acceptable range of values.

* * * * *